US012679101B2

(12) United States Patent
Oya

(10) Patent No.: US 12,679,101 B2
(45) Date of Patent: Jul. 14, 2026

(54) INK CARTRIDGE

(71) Applicant: SEIKO EPSON CORPORATION, Tokyo (JP)

(72) Inventor: Shun Oya, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 174 days.

(21) Appl. No.: 18/627,696

(22) Filed: Apr. 5, 2024

(65) Prior Publication Data

US 2024/0336068 A1 Oct. 10, 2024

(30) Foreign Application Priority Data

Apr. 7, 2023 (JP) ................................ 2023-062606

(51) Int. Cl.
*B41J 2/175* (2006.01)

(52) U.S. Cl.
CPC ................................ *B41J 2/17523* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 29/38
See application file for complete search history.

(56) References Cited

U.S. PATENT DOCUMENTS

| | | | | |
|---|---|---|---|---|
| 4,914,453 | A * | 4/1990 | Kanayama ............... | B41J 2/175 347/86 |
| 8,919,925 | B2 | 12/2014 | Maeshima et al. | |
| 9,061,512 | B2 * | 6/2015 | Nozawa ............... | B41J 2/17536 |
| 10,814,637 | B2 * | 10/2020 | Shimoyama ........... | B41J 2/1752 |
| 2004/0227792 | A1 * | 11/2004 | Iijima ................. | B41J 2/17509 347/84 |

FOREIGN PATENT DOCUMENTS

| | | | |
|---|---|---|---|
| JP | 2014-008672 | A | 1/2014 |

* cited by examiner

*Primary Examiner* — Anh T Vo
(74) *Attorney, Agent, or Firm* — Oliff PLC

(57) ABSTRACT

There is provided an ink cartridge including an accommodation container; and a shutter configured to open and close a supply port and close the supply port in a state where the ink cartridge is not mounted in a printing apparatus, in which the shutter is configured to open the supply port by being relatively displaced with respect to the accommodation container in a direction away from the supply port, as the ink cartridge is displaced with respect to the printing apparatus when the ink cartridge is mounted in the printing apparatus, close the supply port by being relatively displaced as the ink cartridge is displaced with respect to the printing apparatus in a removing direction, which is a direction opposite to the mounting direction, when the ink cartridge is removed from the printing apparatus, and be attached to and detached from the accommodation container.

7 Claims, 13 Drawing Sheets

INK CARTRIDGE

The present application is based on, and claims priority from JP Application Serial Number 2023-062606, filed Apr. 7, 2023, the disclosure of which is hereby incorporated by reference herein in its entirety.

BACKGROUND

1. Technical Field

The present disclosure relates to an ink cartridge.

2. Related Art

JP-A-2014-8672 discloses a container-side shutter disposed at an ink supply port of a container case. The container case includes an ink container. The container-side shutter is configured to be switchable between a closed posture in which the supply port is covered and an open posture in which the supply port is exposed. The container-side shutter includes a guide projection that is locked to a hook formed in a printer when the ink container is mounted on the printer by the user. The movement of the container-side shutter is restricted by locking the guide projection to the hook. After the movement of the container-side shutter is restricted, the container case is pushed in the mounting direction by the user, and accordingly, the container-side shutter is switched from the closed posture to the open posture. Ink is supplied to the printer from the exposed supply port. Further, when the ink container is removed from the printer by the user, the user pulls the container case in the removing direction, and accordingly, the container-side shutter shifts to the closed posture and the guide projection is unlocked. A liquid absorbing member is attached to the container-side shutter, and holds ink dripping from the supply port.

In the container-side shutter of JP-A-2014-8672, when the amount of the ink held by the liquid absorbing member of the container-side shutter increases to the extent that the ink leaks from the liquid absorbing member, and leaks from the container-side shutter, in a state where the container-side shutter is attached to the container case, the ink needs to be washed, and it may be difficult to wash all the ink. Further, the container-side shutter of JP-A-2014-8672 is not easily replaced with a new container-side shutter at the time of reusing the ink container.

SUMMARY

According to an aspect of the present disclosure, there is provided an ink cartridge configured to be attached to and detached from a printing apparatus by being displaced along an attachment/detachment direction, which is a predetermined direction at a predetermined position with respect to the printing apparatus. The ink cartridge includes: an accommodation container configured to accommodate an ink and include a supply port for supplying the ink to the printing apparatus; and a shutter configured to open and close the supply port and close the supply port in a state where the ink cartridge is not mounted in the printing apparatus, and the shutter is configured to open the supply port by being relatively displaced with respect to the accommodation container in a direction away from the supply port, as the ink cartridge is displaced with respect to the printing apparatus in a mounting direction of the attachment/detachment direction when the ink cartridge is mounted in the printing apparatus, be held in the printing apparatus when the ink cartridge is mounted in the printing apparatus, close the supply port by being relatively displaced with respect to the accommodation container in a direction approaching the supply port, as the ink cartridge is displaced with respect to the printing apparatus in a removing direction, which is a direction opposite to the mounting direction, when the ink cartridge is removed from the printing apparatus, and be attached to and detached from the accommodation container.

DESCRIPTION OF EMBODIMENTS

A. First Embodiment

Figure 1:
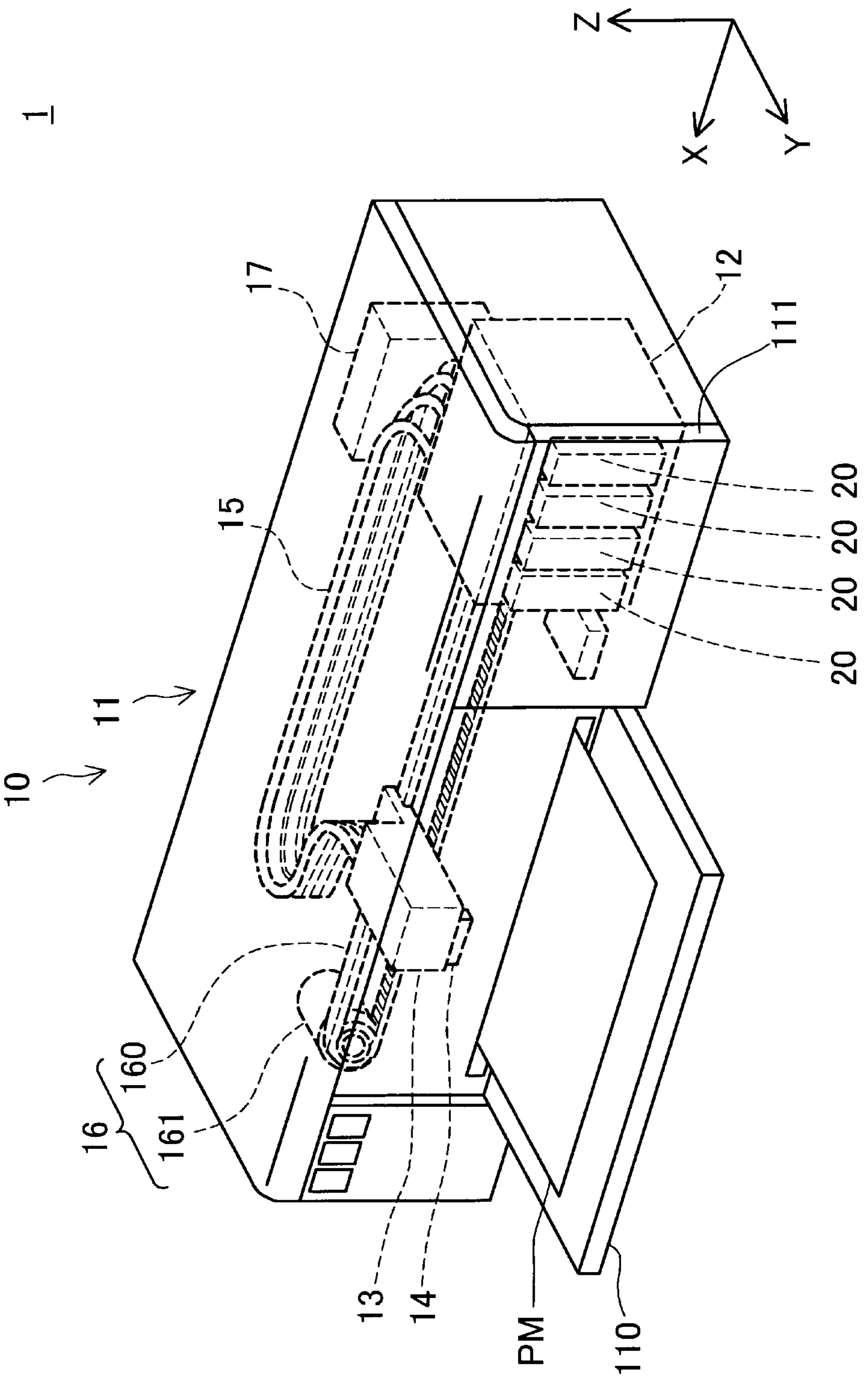
FIG. 1 is a perspective view illustrating a schematic configuration of a printing system.

A1. Configuration of Printing Apparatus 10:

FIG. 1 is a perspective view illustrating a schematic configuration of a printing system 1. FIG. 1 illustrates an X-axis, a Y-axis, and a Z-axis which are three spatial axes orthogonal to each other. The directions of the arrows of the X-axis, the Y-axis, and the Z-axis are a +X direction, a +Y direction, and a +Z direction, respectively. Directions opposite to the +X direction, the +Y direction, and the +Z direction are referred to as a −X direction, a −Y direction, and a −Z direction, respectively. When positiveness and negativeness in the directions along the X-axis, the Y-axis, and the Z-axis do not matter, the directions may be referred to as an X direction, a Y direction, and a Z direction, respectively. In the present embodiment, the X-axis and the Y-axis are axes along a horizontal plane, and the Z-axis is an axis along a gravity direction. A vertically downward direction is the −z direction. The same applies to the drawings and descriptions made below.

In the present embodiment, the printing system 1 performs printing on a print medium by using a plurality of different color inks. As illustrated in FIG. 1, the printing system 1 is used in a state of being disposed on a horizontal plane. The state of the printing system 1 illustrated in FIG. 1 is a use state of the printing system 1. The printing system 1 includes a printing apparatus 10 and four ink cartridges 20.

The printing apparatus 10 ejects ink as a liquid toward a print medium PM to perform printing on the print medium PM. In the present embodiment, the printing apparatus 10 is an ink jet printer. The printing apparatus 10 can accommodate the ink cartridge 20 inside. The printing apparatus 10 includes an accommodation box 11, a cartridge mounting section 12, a carriage 13, an ejection head 14, a tube 15, a drive mechanism 16, and a control section 17.

The accommodation box 11 accommodates the cartridge mounting section 12, the carriage 13, the ejection head 14, the drive mechanism 16, the control section 17, and the ink cartridge 20. The accommodation box 11 has a substantially rectangular shape. The accommodation box 11 includes a front cover 110 and a replacement cover 111. The front cover 110 is a part where the print medium PM on which printing is completed is disposed. The front cover 110 is provided on a wall on the +Y direction side of the accommodation box 11. The front cover 110 is a plate-shaped member extending in the X direction and the Y direction. The replacement cover 111 is opened and closed when the ink cartridge 20 is attached to and detached from the cartridge mounting section 12 by a user. The replacement cover 111 is a part of the wall on the +Y direction side of the accommodation box 11.

Figure 2:
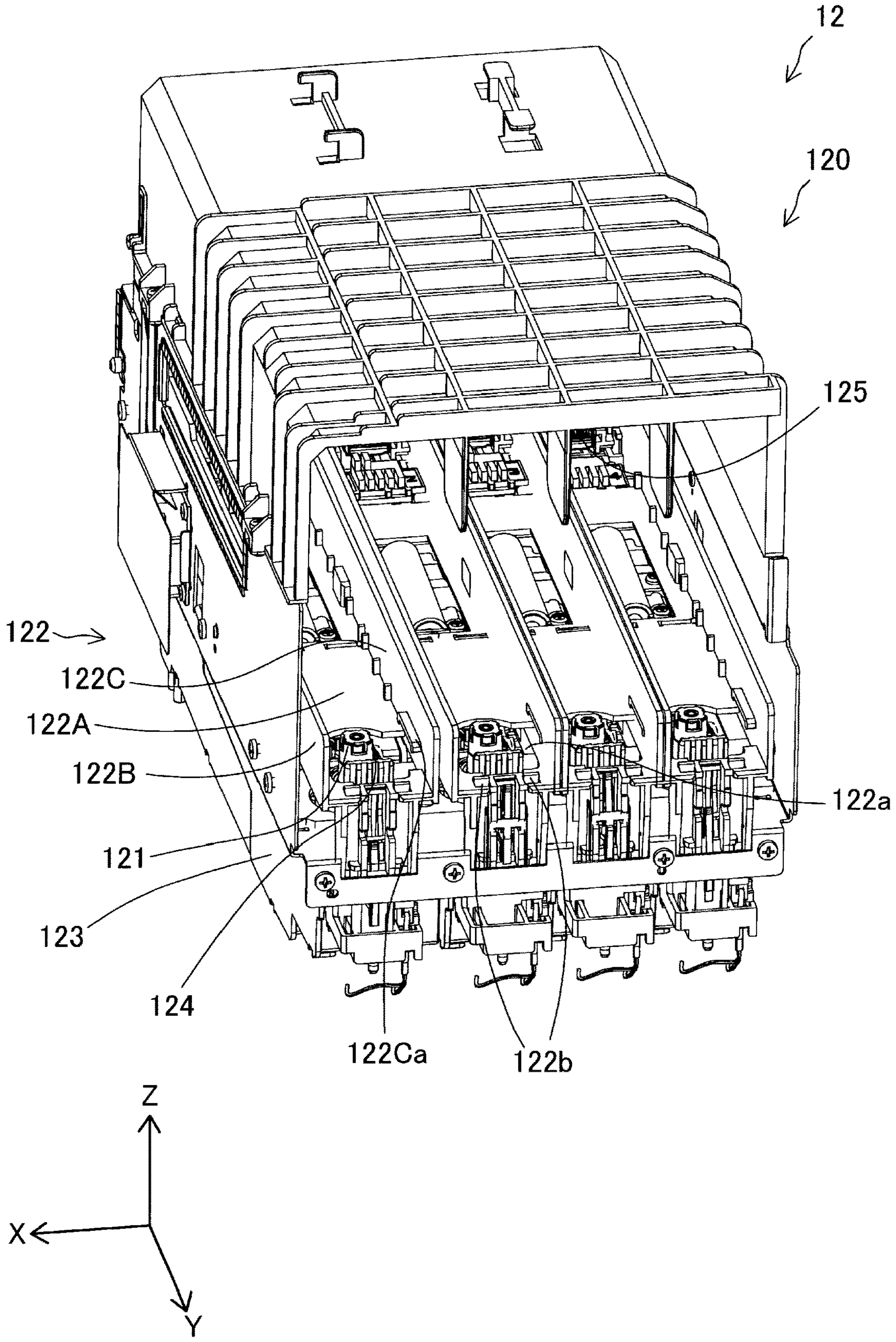
FIG. 2 is a view for describing a cartridge mounting section.

FIG. 2 is a view for describing a cartridge mounting section 12. In FIG. 2, the ink cartridge 20 is not illustrated, and a part of the cartridge mounting section 12 is simplified. In the present embodiment, the ink cartridge 20 is inserted or removed along the Y direction into the cartridge mounting section 12 by the user. Specifically, the ink cartridge 20 is inserted into the cartridge mounting section 12 in the −Y direction by the user. The −Y direction is the mounting direction of the ink cartridge 20 in the attachment/detachment direction. Further, the ink cartridge 20 is pulled out by the user in the +Y direction with respect to the cartridge mounting section 12. The +Y direction is a direction in which the ink cartridge 20 is removed in the attachment/detachment direction. In the present embodiment, the Y direction may be referred to as an "attachment/detachment direction". As illustrated in FIG. 1, a state where the mounting of the ink cartridge 20 on the cartridge mounting section 12 is completed is referred to as a "cartridge mounted state".

The cartridge mounting section 12 supplies the ink supplied from the ink cartridge 20 to the ejection head 14 via the tube 15. As illustrated in FIG. 1, the cartridge mounting section 12 is positioned on the −Y direction side of the replacement cover 111 inside the accommodation box 11. As illustrated in FIG. 2, the cartridge mounting section 12 includes a mounting box 120, a liquid introduction section 121, a support member 122, a liquid storage section 123, an apparatus-side supply port positioning section 124, and an apparatus-side terminal portion 125.

The mounting box 120 accommodates the support member 122, the liquid storage section 123, the apparatus-side supply port positioning section 124, and the apparatus-side terminal portion 125. The mounting box 120 has a substantially rectangular box shape with an open surface on the +Y direction side. The liquid introduction section 121 is supplied with ink from a liquid supply section 222 of the ink cartridge 20. The liquid supply section 222 will be described later. The liquid introduction section 121 is provided on the −Y direction side with respect to the apparatus-side supply port positioning section 124.

The support member 122 is a member that supports the ink cartridge 20 inserted by the user from the −Z direction side with respect to the ink cartridge 20. In the present embodiment, four support members 122 are arranged side by side in the +X direction. The support member 122 has a shape that extends in the Y direction and is recessed in the −Z direction. The support member 122 includes a support bottom wall 122A, a first support side wall 122B, and a second support side wall 122C. The support bottom wall 122A supports the ink cartridge 20 in the Z direction. The support bottom wall 122A includes a support opening section 122*a*, a first support locking section 122*b*, and a second support locking section 122*c*.

Figure 3:
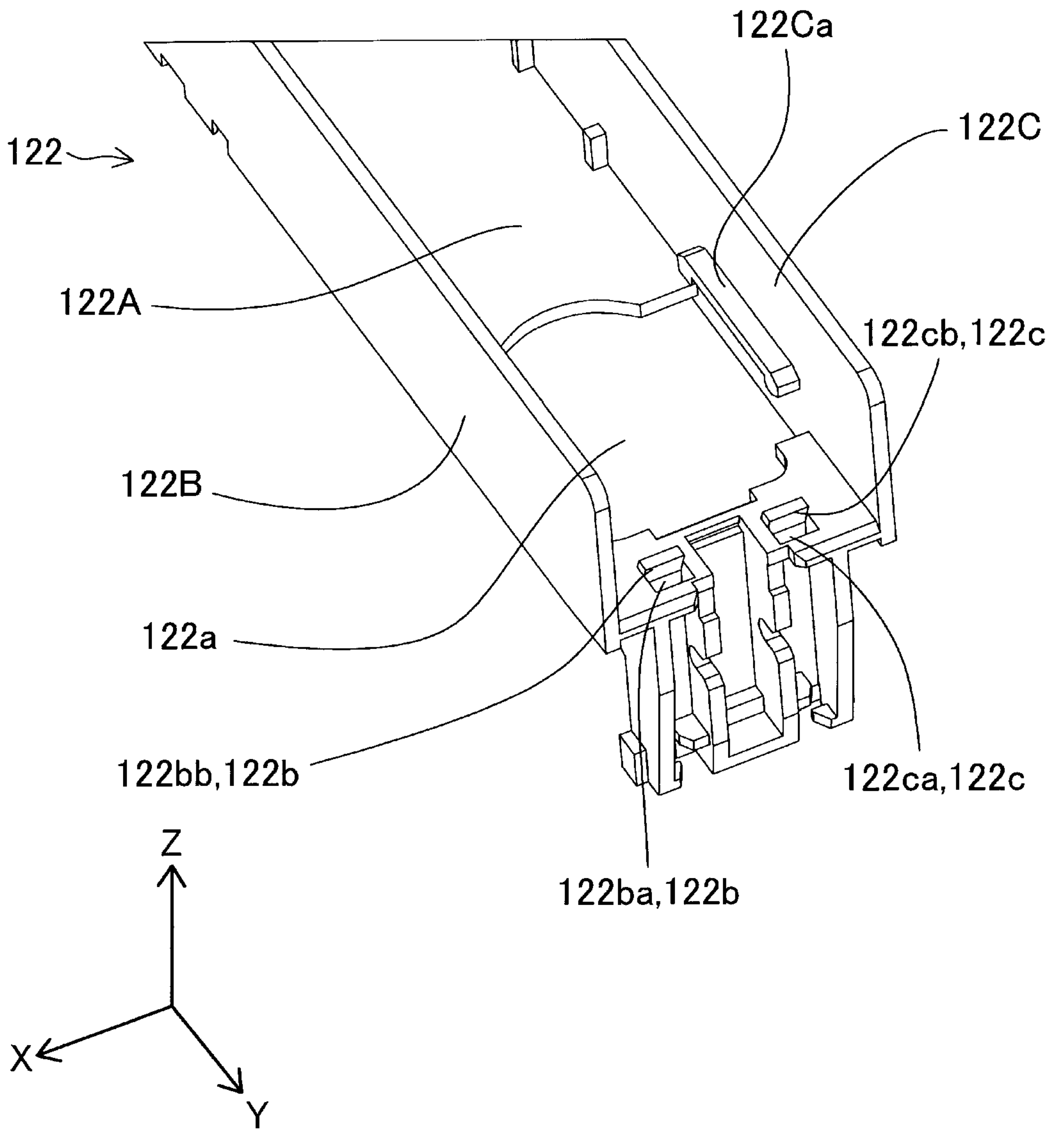
FIG. 3 is a view for describing a part of a support member of FIG. 2 on a +Y direction side.

FIG. 3 is a view for describing a part of the support member 122 of FIG. 2 on the +Y direction side. In FIG. 3, the configuration of the cartridge mounting section 12 other than the support member 122 is not illustrated. The support opening section 122*a* disposes the liquid introduction section 121. As illustrated in FIG. 3, the support opening section 122*a* is formed at the end portion of the support bottom wall 122A on the +Y direction side. The support opening section 122*a* is a hole penetrating in the Z direction. The support opening section 122*a* is formed from the first support side wall 122B to the second support side wall 122C in the X direction.

The first support locking section 122*b* fixes a first protrusion portion 262*b* of the shutter 26 of the ink cartridge 20. The shutter 26 and the first protrusion portion 262*b* will be described later. The first support locking section 122*b* is formed on the +Y direction side with respect to the support opening section 122*a*. The first support locking section 122*b* is formed on the +X direction side with respect to the second support locking section 122*c*. The first support locking section 122*b* includes a first support hole portion 122*ba* and a first support projected portion 122*bb*.

The first support hole portion 122*ba* is fitted by the first protrusion portion 262*b*. The first support hole portion 122*ba* is a hole penetrating the support bottom wall 122A in the Z direction. The first support projected portion 122*bb* restricts the movement of the first protrusion portion fitted into the first support hole portion 122*ba* in the Y direction. The first support projected portion 122*bb* is formed at a position on the mounting direction side with respect to the first support hole portion 122*ba* in the printing apparatus 10. In the present embodiment, the first support projected portion 122*bb* is formed at the end of the first support hole portion 122*ba* on the −Y direction side. The first support projected portion 122*bb* extends in the Z direction.

The second support locking section 122*c* has the same configuration as that of the first support locking section 122*b*. The second support locking section 122*c* fixes a second protrusion portion 263*b* of the shutter 26 of the ink cartridge 20. The second protrusion portion 263*b* will be described later. The second support locking section 122*c* is arranged side by side with the first support locking section 122*b* in the X direction. The second support locking section 122*c* is positioned on the −X direction side with respect to the first support locking section 122*b*. The second support locking section 122*c* includes a second support hole portion 122*ca* and a second support projected portion 122*cb*. The second support hole portion 122*ca* has the same configuration as that of the first support hole portion 122*ba*. The second support projected portion 122*cb* has the same configuration as that of the first support projected portion 122*bb*.

The first support side wall 122B supports the ink cartridge 20 on the +X direction side. The first support side wall 122B extends in the +Z direction from the support bottom wall 122A at the end portion of the support bottom wall 122A on the +X direction side. The second support side wall 122C supports the ink cartridge 20 on the −X direction side. The second support side wall 122C extends in the +Z direction from the support bottom wall 122A at the end portion of the support bottom wall 122A on the −X direction side. The second support side wall 122C faces the first support side wall 122B in the X direction. The second support side wall 122C includes a support guide 122Ca. In FIG. 2, the support guide 122Ca at a part of the support members 122 is not illustrated. The support guide 122Ca is a part that fits into a first groove portion 221*f* of the ink cartridge 20 when the ink cartridge 20 is mounted in the printing apparatus 10. The first groove portion 221*f* will be described later.

The liquid storage section 123 illustrated in FIG. 2 stores the ink received from the ink cartridge 20 via the liquid introduction section 121. The liquid storage section 123 is positioned on the −Z direction side of the liquid introduction section 121. The apparatus-side supply port positioning section 124 restricts the movement of the liquid supply section 222 of the ink cartridge 20 with respect to the liquid introduction section 121. The apparatus-side supply port positioning section 124 penetrates the support opening section 122*a* in the Z direction. The apparatus-side supply port positioning section 124 is positioned on the +Y direction side of the liquid introduction section 121 in the support opening section 122*a*. The apparatus-side supply port positioning section 124 has a substantially rectangular shape. The apparatus-side terminal portion 125 electrically couples the ink cartridge 20 and the printing apparatus 10 in a state where the ink cartridge 20 is mounted in the cartridge mounting section 12.

The carriage 13 illustrated in FIG. 1 moves the ejection head 14 relative to the print medium PM. Specifically, the carriage 13 moves the ejection head 14 by reciprocating in the X direction. The ejection head 14 ejects ink toward the print medium PM to print data such as characters and images on the print medium PM. The tube 15 allows the ink of the cartridge mounting section 12 to flow and supplies the ink to the ejection head 14.

The drive mechanism 16 cause the carriage 13 to reciprocate in the X direction based on a control signal from the control section 17. The drive mechanism 16 includes a timing belt 160 and a drive motor 161. The timing belt 160 transmits the power of the drive motor 161 to the carriage 13. The drive motor 161 rotates the timing belt 160. The control section 17 controls each section of the printing apparatus 10 and exchanges a signal with the ink cartridge 20.

Figure 4:
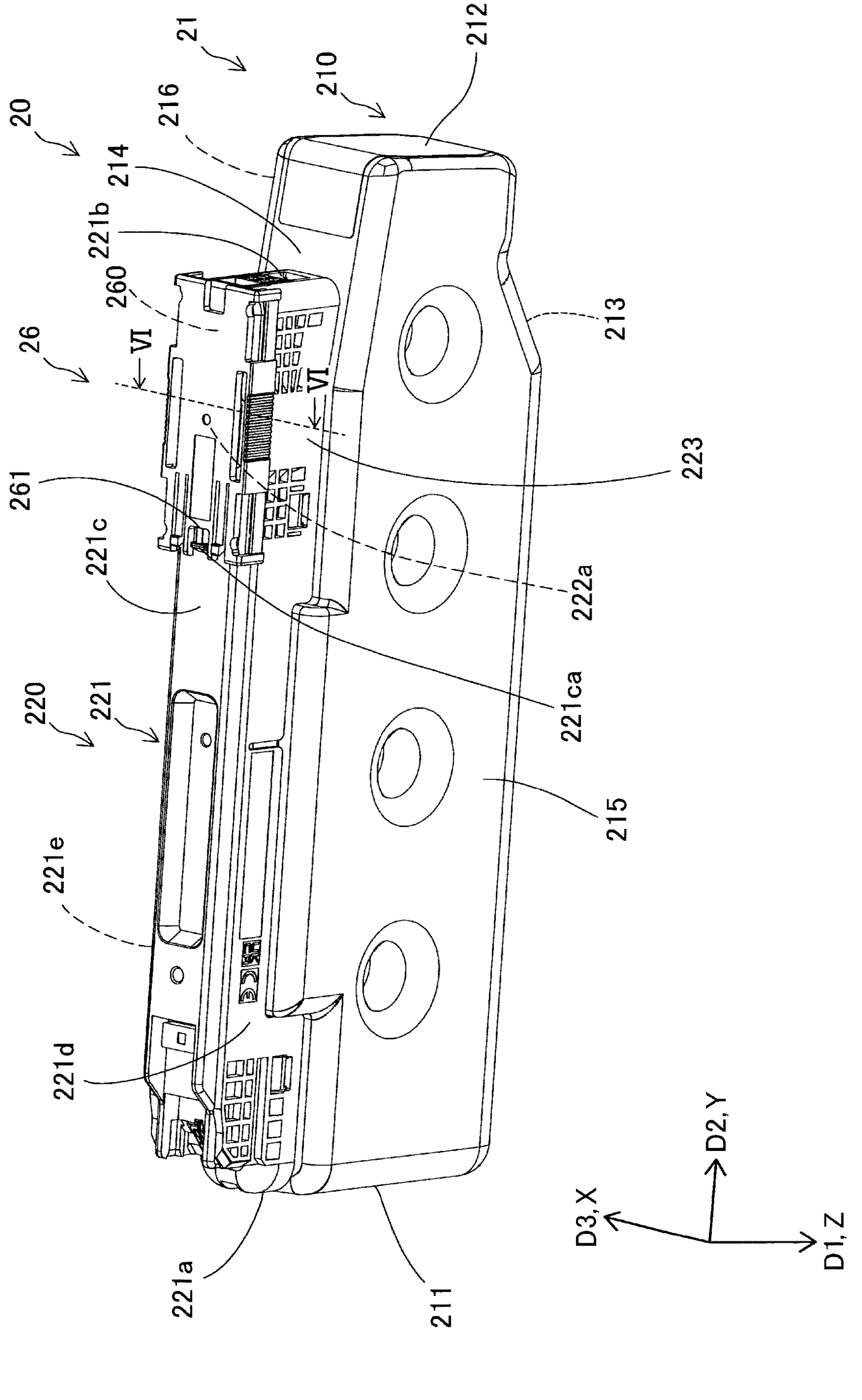
FIG. 4 is a perspective view of an ink cartridge when not mounted on a printing apparatus.

A2. Configuration of Ink Cartridge 20:

FIG. 4 is a perspective view of the ink cartridge 20 when not mounted on the printing apparatus 10. FIG. 4 illustrates a D1 axis, a D2 axis, and a D3 axis, which are three spatial axes orthogonal to each other. The directions of the arrows of the D1 axis, the D2 axis, and the D3 axis are a +D1 direction, a +D2 direction, and a +D3 direction, respectively. Directions opposite to the +D1 direction, the +D2 direction, and the +D3 direction are defined as a −D1 direction, a −D2 direction, and a −D3 direction, respectively. When positiveness and negativeness in the directions along the D1 axis, the D2 axis, and the D3 axis do not matter, the directions may be referred to as a D1 direction, a D2 direction, and a D3 direction, respectively. The direction of the D1 axis is also referred to as a first direction, the direction of the D2 axis is also referred to as a second direction, and the direction of the D3 axis is also referred to as a third direction. The same applies to the drawings and descriptions made below.

Figure 5:
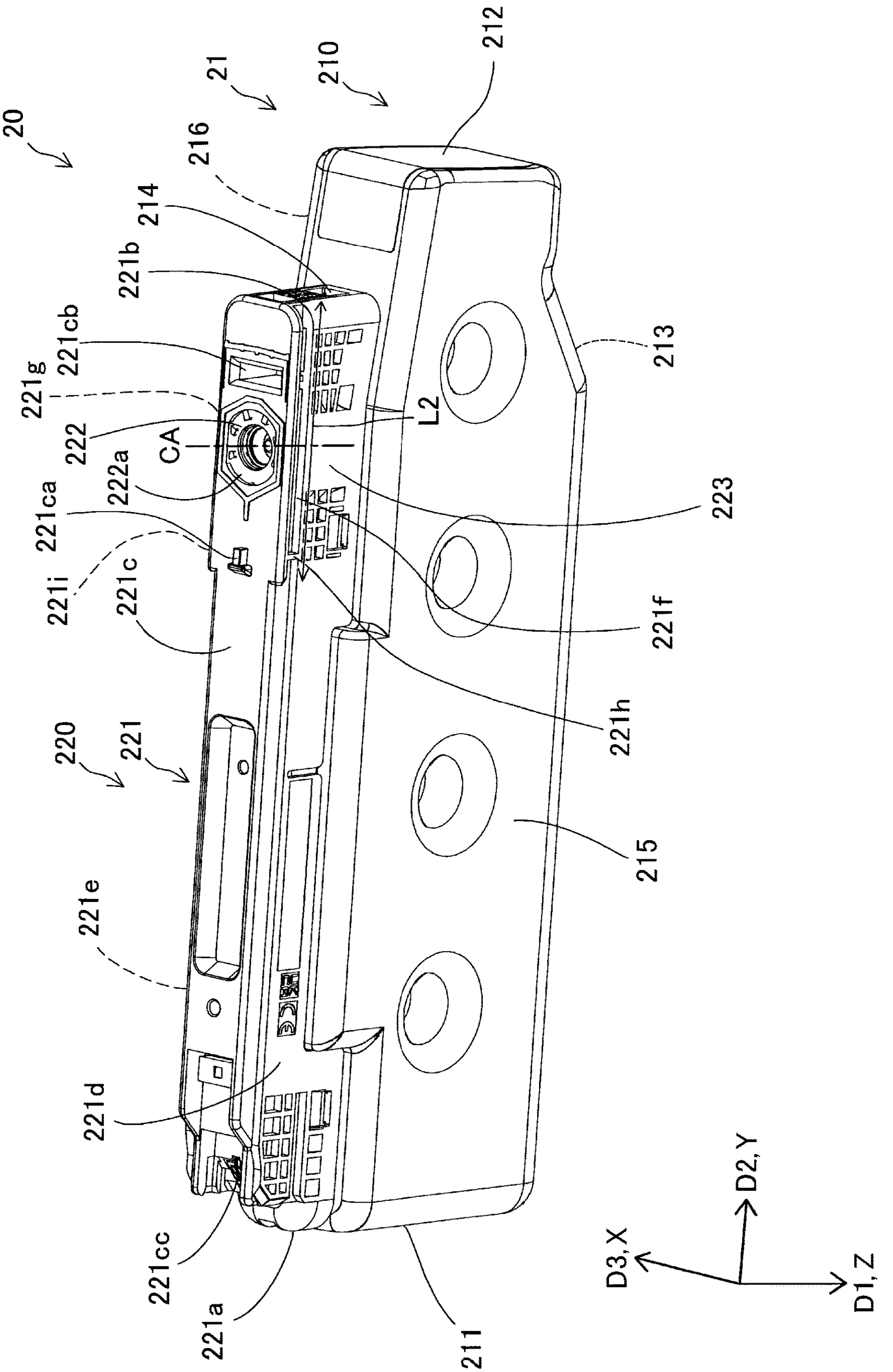
FIG. 5 is a perspective view of an accommodation container when a shutter is removed from the accommodation container.

FIG. 5 is a perspective view of an accommodation container 21 when the shutter 26 is removed from the accommodation container 21. The accommodation container 21 and the attachment and detachment of the shutter 26 to and from the accommodation container 21 will be described later. Hereinafter, as illustrated in FIG. 4, a state where the shutter 26 is mounted in the accommodation container 21 is referred to as a "shutter mounted state", and as illustrated in FIG. 5, a state where the shutter 26 is removed from the accommodation container 21 is referred to as a "shutter removed state".

As illustrated in FIG. 5, the D1 direction is a direction along a central axis CA of a supply port 222*a* of the ink cartridge 20. The D2 direction is a direction that intersects the D1 direction and is parallel to the attachment/detachment direction when the ink cartridge 20 is displaced with respect to the printing apparatus 10 in the Y direction which is the attachment/detachment direction. The D3 direction is a direction that perpendicularly intersects the D1 direction and the D2 direction. When the ink cartridge 20 is displaced in the Y direction with respect to the printing apparatus 10, the ink cartridge 20 is inserted such that the Z direction coincides with the D1 direction, the Y direction coincides with the D2 direction, and the X direction coincides with the D3 direction as illustrated in FIG. 5. In FIG. 4 and FIGS. 9, 11, 14, and 15 (to be described later), the X direction, the Y direction, and the Z direction are illustrated, as in FIG. 5. When the ink cartridge 20 is displaced in the Y direction with respect to the printing apparatus 10, the +D1 direction corresponds to the +Z direction, the +D2 direction corresponds to the +Y direction, and the +D3 direction corresponds to the +X direction. In the present embodiment, the D1 direction is the height direction of the ink cartridge 20, the D2 direction is the depth direction of the ink cartridge 20, and the D3 direction is the width direction of the ink cartridge 20.

The ink cartridge 20 illustrated in FIG. 4 supplies ink to the printing apparatus 10. The ink cartridge 20 is configured to be attachable to and detachable from the printing apparatus 10. Specifically, the ink cartridge 20 is attached to and detached from the printing apparatus 10 by being displaced along the attachment/detachment direction by a user at a predetermined position with respect to the printing apparatus 10. The predetermined position when the ink cartridge 20 is mounted on the printing apparatus 10 is an end portion of the cartridge mounting section 12 on the +Y direction side. The predetermined position when the ink cartridge 20 is removed from the printing apparatus 10 is a position where a cartridge-side terminal 221*cc* is coupled to the apparatus-side terminal portion 125 and the liquid supply section 222 comes off from the liquid introduction section 121. The cartridge-side terminal 221*cc* and the attachment and detachment of the ink cartridge 20 to and from the printing apparatus 10 will be described later. In the present embodiment, different inks are accommodated in the four ink cartridges 20 mounted on the cartridge mounting section 12, respectively. As illustrated in FIG. 4, the ink cartridge 20 includes the accommodation container 21 and the shutter 26.

The accommodation container 21 accommodates an ink and supplies the ink to the printing apparatus 10. The accommodation container 21 is positioned on the +D1 direction side with respect to the shutter 26 in the shutter mounted state. As illustrated in FIG. 5, the accommodation container 21 includes a liquid accommodation body 210 and an adapter 220. The liquid accommodation body 210 accommodates an ink inside. The liquid accommodation body 210 has a substantially rectangular shape. The liquid accommodation body 210 includes an accommodation front wall 211, an accommodation rear wall 212, an accommodation upper wall 213, an accommodation bottom wall 214, a first accommodation side wall 215, and a second accommodation side wall 216.

The accommodation front wall 211 forms a wall of the liquid accommodation body 210 on the −D2 direction side. The accommodation rear wall 212 forms a wall of the liquid accommodation body 210 on the +D2 direction side. The accommodation rear wall 212 faces the accommodation front wall 211 in the D2 direction. The accommodation upper wall 213 forms a wall of the liquid accommodation body 210 on the +D1 direction side. The accommodation bottom wall 214 forms a wall of the liquid accommodation body 210 on the −D1 direction side. The accommodation bottom wall 214 faces the accommodation upper wall 213 in the D1 direction. The first accommodation side wall 215 forms a wall of the liquid accommodation body 210 on the −D3 direction side. The second accommodation side wall 216 forms a wall of the liquid accommodation body 210 on the +D3 direction side. The second accommodation side wall 216 faces the first accommodation side wall 215 in the D3 direction.

The adapter 220 is a part coupled to the cartridge mounting section 12 when the ink cartridge 20 is mounted in the printing apparatus 10. The adapter 220 is disposed to be in contact with the accommodation bottom wall 214 on the accommodation bottom wall 214 on the −D1 direction side. The adapter 220 has a substantially rectangular shape. The adapter 220 includes an outer shell portion 221, the liquid supply section 222, and a supply section arrangement chamber 223.

The outer shell portion 221 forms an outer shell of the adapter 220. The outer shell portion 221 includes an adapter front wall 221*a*, an adapter rear wall 221*b*, an adapter bottom wall 221*c*, an adapter first side wall 221*d*, an adapter second side wall 221*e*, the first groove portion 221*f*, a second groove portion 221*g*, a first locking section 221*h*, and a second locking section 221*i*. The adapter front wall 221*a* forms a wall on the outer shell portion 221 on the −D2 direction side. The adapter rear wall 221*b* forms a wall on the +D2 direction side of the outer shell portion 221. The adapter rear wall 221*b* faces the adapter front wall 221*a* in the D2 direction. The adapter bottom wall 221*c* forms a wall on the −Z direction side of the outer shell portion 221. The adapter bottom wall 221*c* faces the accommodation bottom wall 214 in the D1 direction. The adapter bottom wall 221*c* includes an adapter-side positioning section 221*ca*, a supply port positioning section 221*cb*, and the cartridge-side terminal 221*cc*.

The adapter-side positioning section 221*ca* restricts the movement of the shutter 26 in the −D2 direction with respect to the accommodation container 21 in a shutter mounted state. The movement of the shutter 26 with respect to the accommodation container 21 will be described later. The adapter-side positioning section 221*ca* is disposed on the −D2 direction side with respect to the liquid supply section 222. The adapter-side positioning section 221*ca* has a shape protruding from the adapter bottom wall 221*c* in the −D1 direction.

The supply port positioning section 221*cb* is a part where the apparatus-side supply port positioning section 124 is fitted in the cartridge mounted state. The fitting between the supply port positioning section 221*cb* and the apparatus-side supply port positioning section 124 in the cartridge mounted state will be described later. The supply port positioning section 221*cb* is positioned on a side opposite to the cartridge-side terminal 221*cc* with respect to the liquid supply section 222 in the D2 direction. As illustrated in FIG. 4, the supply port positioning section 221*cb* is closed by the shutter 26 in the shutter mounted state. The supply port positioning section 221*cb* has a shape recessed in the +D1 direction.

The cartridge-side terminal 221*cc* illustrated in FIG. 5 electrically couples the ink cartridge 20 to the printing apparatus 10 by coming into contact with the apparatus-side terminal portion 125 in the cartridge mounted state. The cartridge-side terminal 221*cc* is provided at the end portion of the accommodation bottom wall 214 on the −D2 direction side.

The liquid supply section 222 supplies ink to the printing apparatus 10 by causing the ink accommodated in the liquid accommodation body 210 to flow out to the printing apparatus 10. Specifically, the liquid supply section 222 supplies the ink accommodated in the liquid accommodation body 210 to the liquid introduction section 121 of the cartridge mounting section 12. The liquid supply section 222 communicates the inside and the outside of the liquid accommodation body 210. In the present embodiment, the liquid supply section 222 is a substantially cylindrical member having a central axis CA in the D1 direction. The liquid supply section has the supply port 222*a*.

The supply port 222*a* is a part for supplying ink to the printing apparatus 10. The supply port 222*a* is disposed between the adapter-side positioning section 221*ca* and the supply port positioning section 221*cb* in the D2 direction. In other words, from the −Y direction side to the +Y direction side, the adapter-side positioning section 221*ca*, the supply port 222*a*, and the supply port positioning section 221*cb* are arranged in this order.

As illustrated in FIG. 4, in the shutter mounted state, the supply port 222*a* is closed by the shutter 26. As illustrated in FIG. 5, the supply port 222*a* is open in the shutter removed state. In the present specification, a state where the supply port 222*a* is open means a state where the supply port 222*a* is not closed by the shutter 26. In the cartridge mounted state, the shutter 26 is open. A state of the supply port 222*a* in the cartridge mounted state will be described later.

The supply section arrangement chamber 223 is a space that accommodates the liquid supply section 222. The supply section arrangement chamber 223 is formed at a part surrounded by the adapter rear wall 221*b*, the adapter bottom wall 221*c*, the adapter first side wall 221*d*, and the adapter second side wall 221*e* on the end portion side in the +D2 direction.

The adapter first side wall 221*d* forms a wall on the −D3 direction side of the outer shell portion 221. The adapter second side wall 221*e* forms a wall on the +D3 direction side of the outer shell portion 221. The adapter second side wall 221*e* faces the adapter first side wall 221*d* in the D3 direction.

Figure 6:
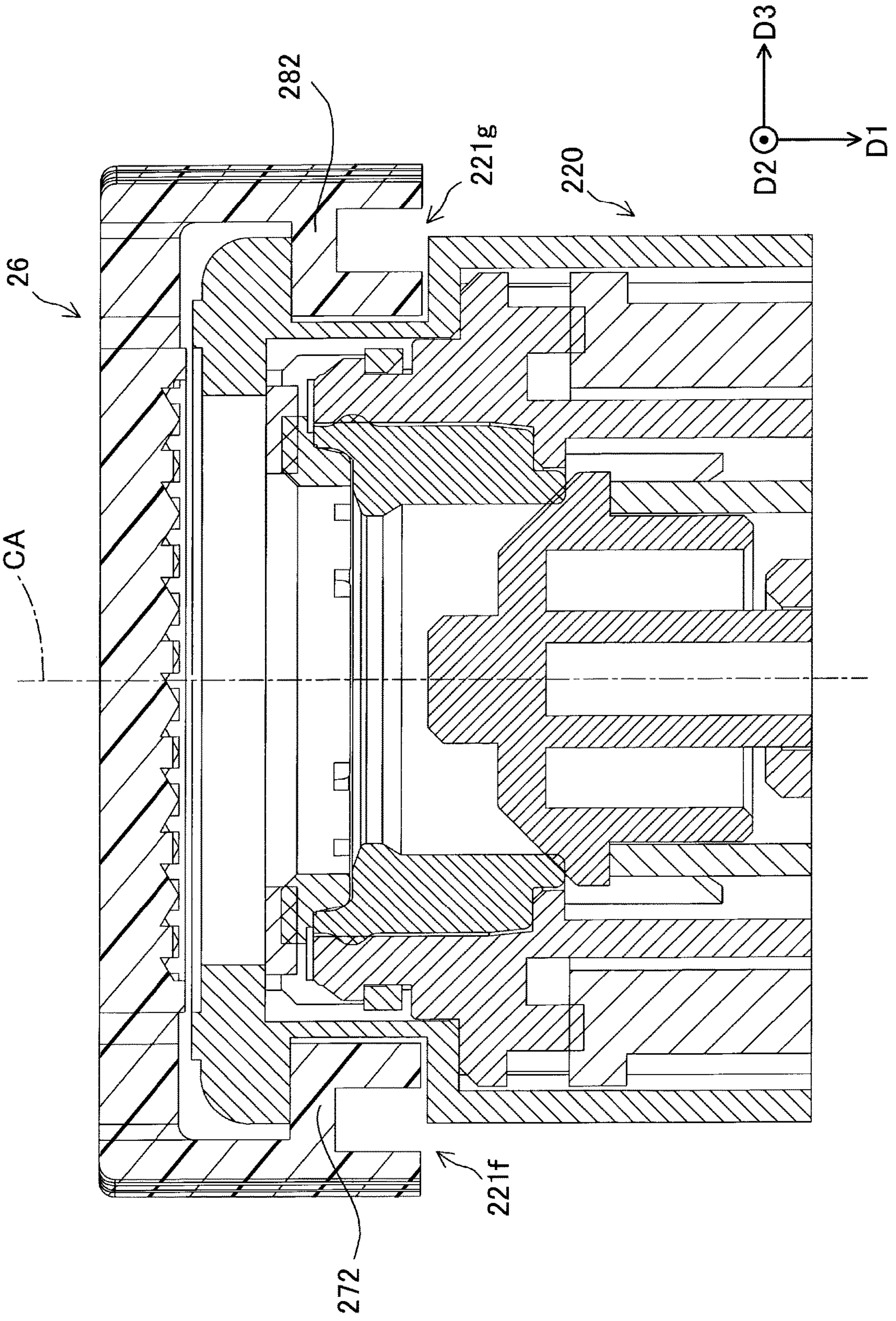
FIG. 6 is a cross-sectional view taken along the line VI-VI of FIG. 4.

FIG. 6 is a cross-sectional view taken along the line VI-VI of FIG. 4. As illustrated in FIG. 6, the first groove portion 221*f* is a part in which a first guide 272 of the shutter 26 can be fitted. The first guide 272 will be described later. The first groove portion 221*f* restricts the movement of the shutter 26 in the D1 direction. The first groove portion 221*f* extends from the end portion of the accommodation container 21 in the D2 direction along the D2 direction when viewed in the D3 direction. In the present embodiment, as illustrated in FIG. 5, the first groove portion 221*f* is an end portion on the –D1 direction side and the +D2 direction side of the liquid accommodation body 210 forming the accommodation container 21 and the adapter 220, and extends from the adapter rear wall 221*b* of the adapter 220 in the –D2 direction. The first groove portion 221*f* is continuous from the adapter rear wall 221*b* to the adapter first side wall 221*d*. The second groove portion 221*g* illustrated in FIG. 6 is a part at which a second guide 282 of the shutter 26 is inserted and removed. The second guide 282 will be described later. The second groove portion 221*g* has the same configuration as the first groove portion 221*f*. The second groove portion 221*g* faces the first groove portion 221*f* in the D3 direction.

The first locking section 221*h* illustrated in FIG. 5 restricts the movement of a first projection portion 271 of the shutter 26 in the +D2 direction side in the shutter mounted state. The first projection portion 271 will be described later. The first locking section 221*h* is formed on a side opposite to the adapter rear wall 221*b*, which is the end portion of the accommodation container 21, with respect to the supply port 222*a* in the D2 direction. That is, the first locking section 221*h* is formed on the –D2 direction side with respect to the supply port 222*a*. The first locking section 221*h* extends on the –D3 direction side. In the present embodiment, the first locking section 221*h* extends in the –D3 direction from the adapter first side wall 221*d* in the first groove portion 221*f*.

The second locking section 221*i* restricts a movement of a second projection portion 281 of the shutter 26 in the +D2 direction side in the shutter mounted state. The second projection portion 281 will be described later. The second locking section 221*i* is formed on the side opposite to the adapter rear wall 221*b*, which is the end portion of the accommodation container 21, with respect to the supply port 222*a* in the D2 direction. In other words, the second locking section 221*i* is formed on the –D2 direction side with respect to the supply port 222*a*. The second locking section 221*i* extends in +D3. In the present embodiment, the second locking section extends in the +D3 direction from the adapter first side wall 221*d* in the second groove portion 221*g*.

As illustrated in FIG. 4, the shutter 26 closes the supply port 222*a* in the shutter mounted state. The shutter 26 protects the supply port 222*a*, and holds the ink when the ink accommodated in the liquid accommodation body 210 is exposed from the supply port 222*a*.

Figure 7:
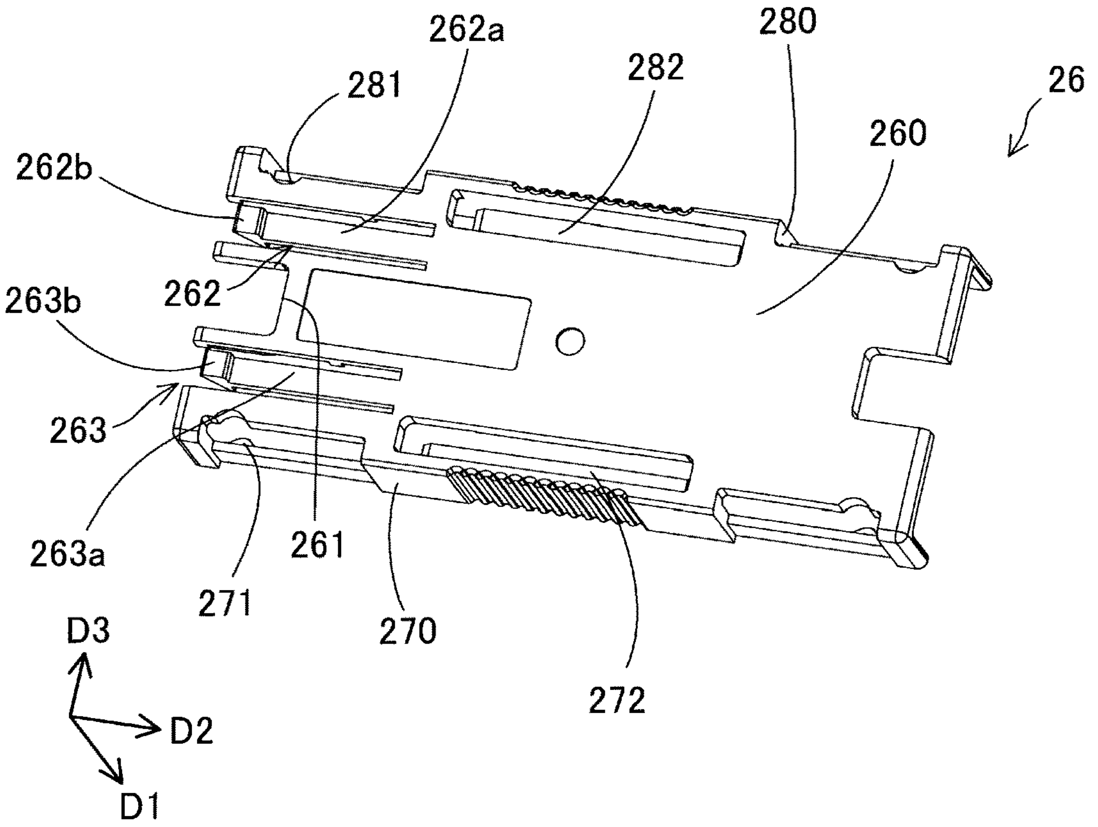
FIG. 7 is a perspective view of a shutter.
Figure 8:
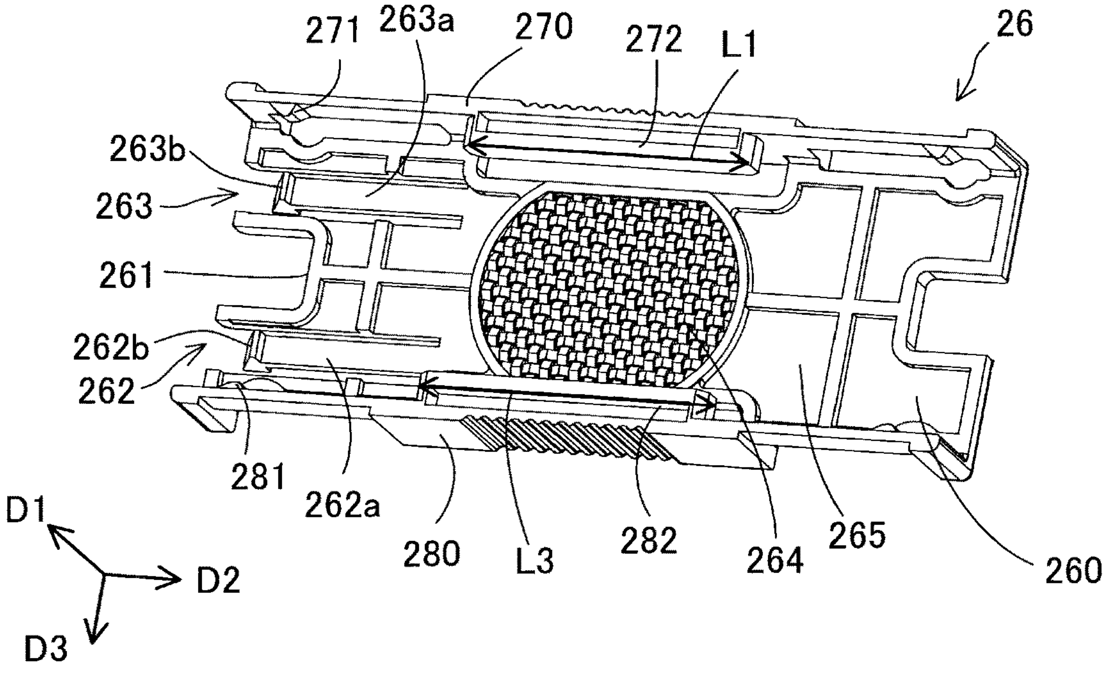
FIG. 8 is a perspective view of the shutter of FIG. 7 when viewed from a back side.
Figure 9:
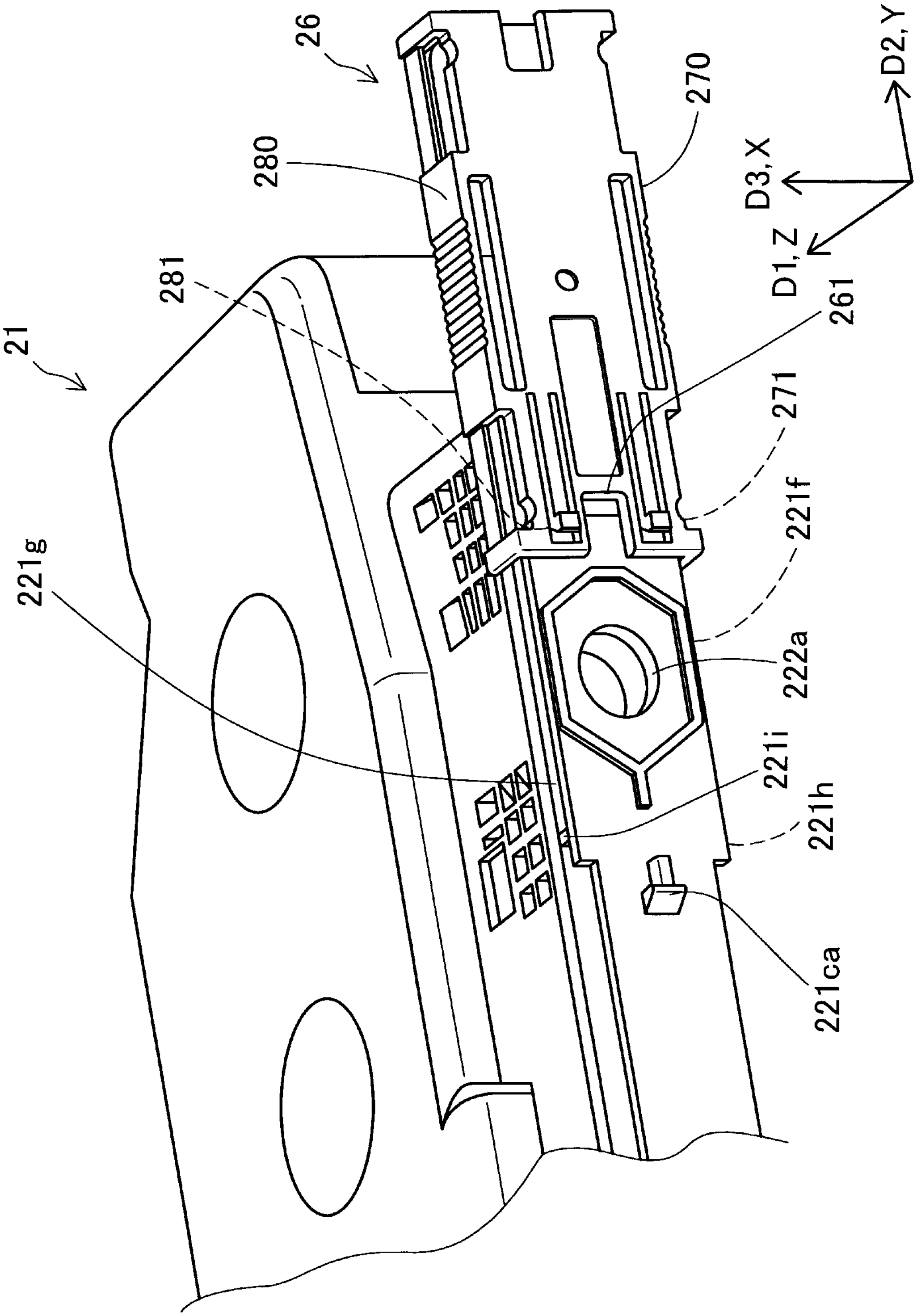
FIG. 9 is a view illustrating a state where the shutter is displaced with respect to the accommodation container in a D2 direction.

FIG. 7 is a perspective view of the shutter 26. FIG. 8 is a perspective view of the shutter 26 of FIG. 7 when viewed from the back side. FIG. 9 is a view illustrating a state where the shutter 26 is displaced with respect to the accommodation container in the D2 direction. As illustrated in FIG. 9, the shutter 26 can open and close the supply port 222*a* by being displaced in the D2 direction with respect to the accommodation container 21. The opening and closing of the supply port 222*a* by the displacement of the shutter 26 will be described later. Further, the shutter 26 is attachable to and detachable from the accommodation container 21 by being displaced in the D2 direction with respect to the accommodation container by the user. Specifically, the shutter 26 is removed from the accommodation container 21 by moving the shutter 26 toward the +D2 direction in the D2 direction by the user. In addition, when the shutter 26 is moved in the –D2 direction by the user, the shutter 26 is mounted in the accommodation container 21. The attachment and detachment of the shutter 26 to and from the accommodation container 21 will be described later. The shutter 26 is formed of an elastic material. In the present embodiment, the material is polypropylene. The shutter in the present embodiment can be elastically deformed when a force is applied to the ink cartridge by the user. As illustrated in FIGS. 7 and 8, the shutter 26 includes a sealing wall 260, a first shutter side wall 270, and a second shutter side wall 280.

As illustrated in FIG. 4, the sealing wall 260 is a wall that closes the supply port 222*a* in the shutter mounted state. The sealing wall 260 has a substantially rectangular plate shape extending in the D2 direction and the D3 direction. In the shutter mounted state, the sealing wall 260 faces the adapter bottom wall 221*c* of the adapter 220 of the ink cartridge 20 in the D1 direction. As illustrated in FIGS. 7 and 8, the sealing wall 260 includes a shutter-side position determination section 261, a first fixing section 262, a second fixing section 263, an uneven portion 264, and a plurality of shutter recess portions 265.

Figure 10:
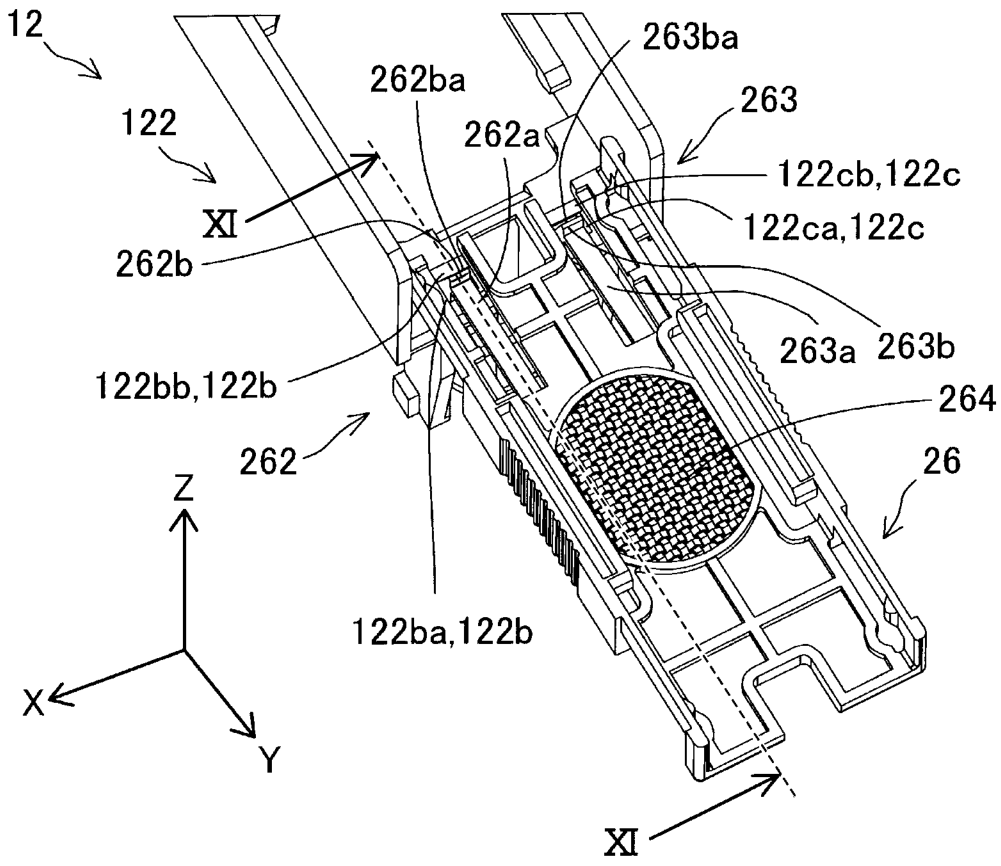
FIG. 10 is a view for describing a state where a first protrusion portion is fitted into a first support hole portion.

As illustrated in FIG. 4, the shutter-side position determination section 261 comes into contact with the adapter-side positioning section 221*ca* in the shutter mounted state. The shutter-side position determination section 261 faces the adapter-side positioning section 221*ca* in the D2 direction in the shutter mounted state. Specifically, the shutter-side position determination section 261 is positioned on the +D2 direction side with respect to the adapter-side positioning section 221*ca*. As illustrated in FIGS. 7 and 8, in the present embodiment, the shutter-side position determination section 261 has a shape that is recessed toward the +D2 direction side at the end portion of the sealing wall 260 on the –D2 direction side. FIG. 10 is a view for describing a state where the first protrusion portion 262*b* is fitted into the first support hole portion 122*ba*. In FIG. 10, the printing apparatus 10 is simplified and the accommodation container 21 is not illustrated. The first fixing section 262 is a part that can be fitted to the first support locking section 122*b* of the cartridge mounting section 12. The method of fitting the first fixing section 262 with the first support locking section 122*b* will be described later. As illustrated in FIG. 8, the first fixing section 262 extends in the –D2 direction on the –D2 direction side of the sealing wall 260 with respect to the uneven portion 264. The first fixing section 262 includes a first rod-shaped portion 262*a* and the first protrusion portion 262*b*. The first rod-shaped portion 262*a* has a substantially rectangular shape extending in the D2 direction.

Figure 11:
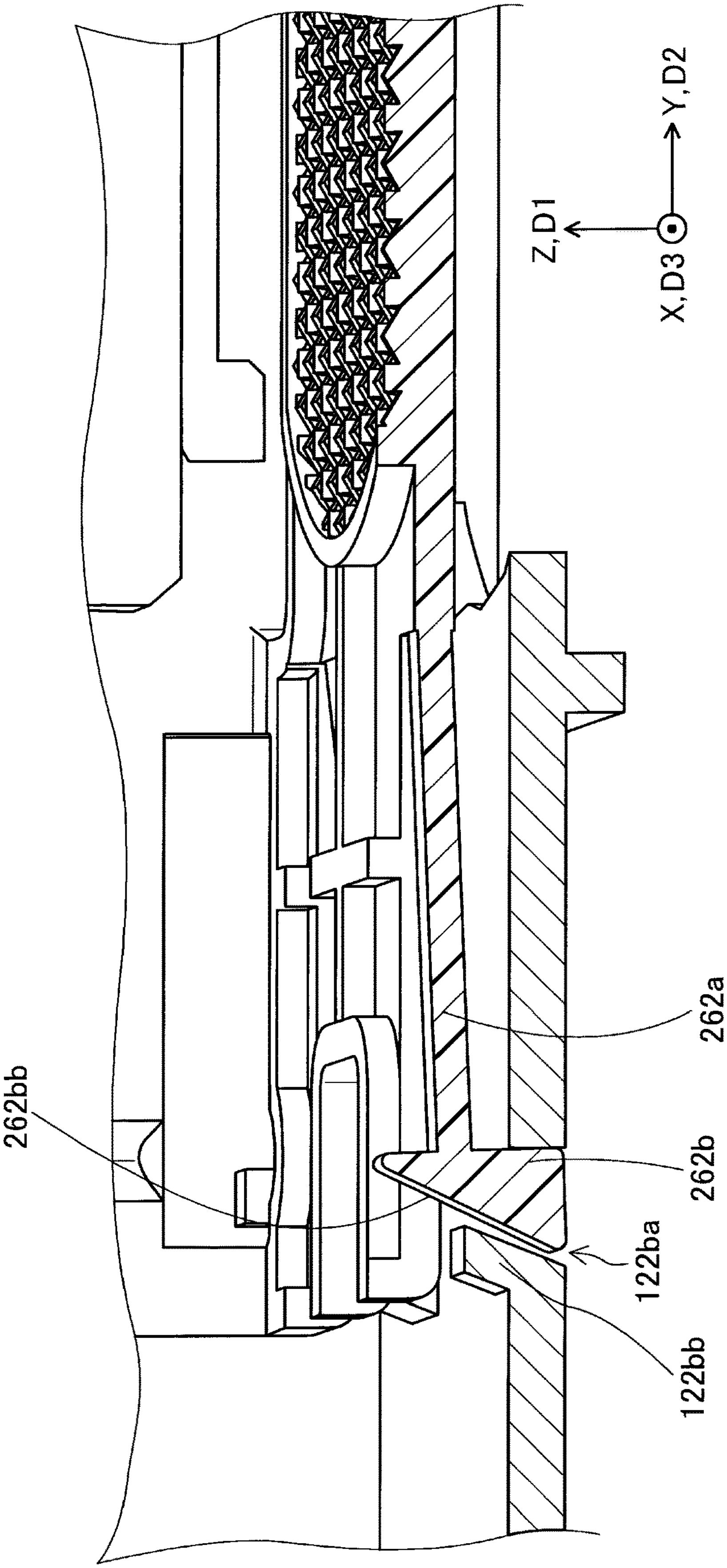
FIG. 11 is a cross-sectional view taken along the line XI-XI of FIG. 10.

FIG. 11 is a cross-sectional view taken along line XI-XI of FIG. 10. In FIG. 11, the printing apparatus 10 is simplified. As illustrated in FIG. 11, the first protrusion portion 262*b* can be fitted into the first support hole portion 122*ba* of the support member 122. Further, the first protrusion portion 262*b* can come into contact with the first support projected portion 122*bb* in a state of being fitted into the first support hole portion 122*ba*. FIG. 11 illustrates a state where the first protrusion portion 262*b* and the first support projected portion 122*bb* are separated from each other. The first protrusion portion 262*b* is coupled to the end portion of the first rod-shaped portion 262*a* on the –D2 direction side. The first protrusion portion 262*b* has a substantially triangular shape in a cross section on a plane including the D1 direction and the D2 direction. The first protrusion portion 262*b* extends in the D1 direction. That is, the first protrusion portion 262*b* extends in the Z direction when the ink cartridge 20 is displaced in the Y direction. The first protrusion portion 262*b* includes a first tapered surface 262*ba*. The first tapered surface 262*ba* can come into contact with the first support projected portion 122*bb*.

The second fixing section 263 illustrated in FIG. 10 is a part that can be fitted to the second support locking section 122*c* of the support member 122. As illustrated in FIG. 8, the second fixing section 263 extends in the –D2 direction on the side of the sealing wall 260 on the −D2 direction side with respect to the uneven portion 264. The second fixing section 263 is arranged side by side with the first fixing section 262 in the D3 direction, and is positioned on the −D3 direction side with respect to the first fixing section 262. The second fixing section 263 includes a second rod-shaped portion 263*a* and a second protrusion portion 263*b*. The second rod-shaped portion 263*a* has a substantially rectangular shape extending in the D2 direction. As illustrated in FIG. 10, the second protrusion portion 263*b* can be fitted into the second support hole portion 122*ca*. Further, the second protrusion portion 263*b* can come into contact with the second support projected portion 122*cb* in a state of being fitted into the second support hole portion 122*ca*. The second protrusion portion 263*b* has the same shape as that of the first protrusion portion 262*b*. The second protrusion portion 263*b* includes a second tapered surface 263*ba*. The second protrusion portion 263*b* can come into contact with the second support projected portion 122*cb*.

The uneven portion 264 illustrated in FIG. 8 is a part that holds the ink when the ink leaks from the supply port 222*a*. In the shutter mounted state, the uneven portion 264 faces the supply port 222*a*. Although not illustrated, a space is generated between the uneven portion 264 and the supply port 222*a* in the shutter mounted state. In addition, although not illustrated, the supply port 222*a* is included within a range in which the uneven portion 264 is formed when viewed in the D1 direction. The uneven portion 264 is formed at the center of the surface of the sealing wall 260 on the +D1 side.

The plurality of shutter recess portions 265 are parts that hold ink when the ink leaks from the uneven portion 264. Each of the shutter recess portions 265 is formed at a part of the surface of the sealing wall 260 facing the supply port 222*a*, where the uneven portion 264 is not formed, in the shutter mounted state. The shutter recess portion 265 is recessed in the −D1 direction which is a direction away from the supply port 222*a* in the D1 direction. In the present embodiment, the shapes of the plurality of shutter recess portions 265 are different from each other.

The first shutter side wall 270 illustrated in FIGS. 7 and 8 is coupled to the end portion of the sealing wall 260 on the −D3 side. The first shutter side wall 270 includes a first projection portion 271 and a first guide 272.

In the shutter mounted state, the first projection portion 271 restricts the movement of the shutter 26 on the +D2 direction side by coming into contact with the first locking section 221*h*. A state of contact between the first projection portion 271 and the first locking section 221*h* is not illustrated. In the shutter mounted state, the first projection portion 271 is positioned on the side in which the shutter 26 is inserted with respect to the accommodation container 21 in the D2 direction. In the present embodiment, the first projection portion 271 is positioned on the −D2 direction side with respect to the first locking section 221*h*. The first projection portion 271 faces the first locking section 221*h* in the D2 direction in the shutter mounted state. The first projection portion 271 protrudes in the +D3 direction on the surface of the first shutter side wall 270 on the +D3 direction side.

As illustrated in FIG. 6, the first guide 272 can be fitted into the first groove portion 221*f* by being inserted into the first groove portion 221*f* of the accommodation container 21. In addition, the first guide 272 can move the first groove portion 221*f* in the D2 direction in a state of being fitted into the first groove portion 221*f*. The first guide 272 restricts the movement of the shutter 26 in the D1 direction in the shutter mounted state. As illustrated in FIG. 7 and FIG. 8, the first guide 272 protrudes in the +D3 direction on the surface of the first shutter side wall 270 on the +D3 direction side. The first guide 272 has a substantially rectangular shape extending in the D2 direction. In the first guide 272, a dimension L1 in the D2 direction illustrated in FIG. 8 is smaller than a dimension L2 of the first groove portion 221*f* in the D2 direction illustrated in FIG. 5.

The second shutter side wall 280 illustrated in FIG. 8 is coupled to the end portion of the sealing wall 260 on the +D3 side. The second shutter side wall 280 includes the second projection portion 281 and the second guide 282.

The second projection portion 281 restricts the movement of the shutter 26 to the +D2 direction side by coming into contact with the second locking section 221*i* in the shutter mounted state. A state of contact between the second projection portion 281 and the second locking section 221*i* is not illustrated. The second projection portion 281 is positioned on the −D2 direction side with respect to the second locking section 221*i* in the shutter mounted state. The second projection portion 281 faces the second locking section 221*i* in the D2 direction in the shutter mounted state. The second projection portion 281 protrudes in the −D3 direction on the surface of the second shutter side wall 280 on the −D3 direction side.

As illustrated in FIG. 6, the second guide 282 can be fitted into the second groove portion 221*g* by being inserted into the second groove portion 221*g* of the accommodation container 21. In addition, the second guide 282 can move the second groove portion 221*g* in the D2 direction in a state of being fitted into the second groove portion 221*g*. The second guide 282 restricts the shutter 26 from moving in the D1 direction in the shutter mounted state. The second guide 282 protrudes in the −D3 direction on the surface of the second shutter side wall 280 on the −D3 direction side. The second guide 282 faces the first guide 272 in the D3 direction. The second guide 282 has a substantially rectangular shape extending in the D2 direction. In the second guide 282, the dimension L3 in the D2 direction is smaller than the dimension of the second groove portion 221*g* in the D2 direction. The dimension L3 of the second guide 282 is the same as the dimension L1 of the first guide 272.

A3. Displacement of Shutter 26 with Respect to Accommodation Container 21:

As described above, the shutter 26 of the present embodiment can be displaced in the D2 direction with respect to the accommodation container 21 in the shutter mounted state. As a premise, the displacement of the shutter 26 is performed by the user. From the state illustrated in FIG. 4, the first guide 272 fitted into the first groove portion 221*f* and the second guide 282 fitted into the second groove portion 221*g* are displaced on the +D2 direction side with respect to the accommodation container 21, and accordingly, the entire shutter 26 is displaced to the +D2 direction with respect to the accommodation container 21. Similarly, the first guide 272 is displaced to the −D2 direction side with respect to the accommodation container 21 in a state of being fitted into the first groove portion 221*f*, the second guide 282 is displaced to the −D2 direction side with respect to the accommodation container 21 in a state of being fitted to the second groove portion 221*g*, and accordingly, the entire shutter is displaced in the −D2 direction with respect to the accommodation container 21.

As the shutter 26 is displaced with respect to the accommodation container 21, the supply port 222*a* is opened and closed when the ink cartridge 20 is attached to and detached from the printing apparatus 10. Further, the shutter 26 is displaced with respect to the accommodation container 21, and accordingly, the shutter 26 is attached to and detached from the accommodation container 21.

A4. Attachment/Detachment of Ink Cartridge 20 to and from Printing Apparatus 10:

The attachment and detachment of the ink cartridge 20 to and from the printing apparatus 10 will be described. The attachment and detachment of the ink cartridge 20 to and from the printing apparatus 10 is performed by a user.

Next, the attachment of the ink cartridge 20 to the printing apparatus 10 will be described. First, the replacement cover 111 in FIG. 1 is opened by a user. The ink cartridge 20 in the shutter mounted state is disposed at a predetermined position with respect to the cartridge mounting section 12, and then is inserted in the −Y direction. At this time, as described above, the ink cartridge 20 is inserted such that the +D1 direction illustrated in FIG. 4 coincides with the +Z direction illustrated in FIG. 1, the +D2 direction coincides with the +Y direction, and the +D3 direction coincides with the +X direction.

As the ink cartridge 20 is displaced with respect to the printing apparatus 10 in the −Y direction, which is the mounting direction, as illustrated in FIG. 11, the first protrusion portion 262*b* of the shutter 26 is fitted into the first support hole portion 122*ba*. At this time, the first tapered surface 262*ba* comes into contact with the first support projected portion 122*bb* that extends in the Z direction. Similarly, the second protrusion portion 263*b* is fitted into the second support hole portion 122*ca*, and the second tapered surface 263*ba* comes into contact with the second support projected portion 122*cb*. Thereby, movement of the shutter 26 in the Y direction is restricted.

In the state, when the accommodation container 21 is further inserted in the −Y direction side by the user, the first projection portion 271 of the shutter 26 illustrated in FIG. 7 elastically deforms and overcomes the first locking section 221*h* of the adapter 220 illustrated in FIG. 5 in the accommodation container 21 displaced with respect to the printing apparatus 10 in the −Y direction. As a result, the first projection portion 271 is displaced with respect to the first locking section 221*h* in the +Y direction side. In addition, the second projection portion 281 elastically deforms and overcomes the second locking section 221*i*. As a result, the second projection portion 281 is displaced with respect to the second locking section 221*i* in the +Y direction side. The first guide 272 is displaced in the first groove portion 221*f* with respect to the accommodation container 21 to the +Y direction side. Similarly, the second guide 282 is displaced in the second groove portion with respect to the accommodation container 21 in the +Y direction side. In addition, the support guide 122Ca is fitted into the first groove portion 221*f*, and accordingly, the displacement of the accommodation container 21 in the Z direction is restricted.

Figure 12:
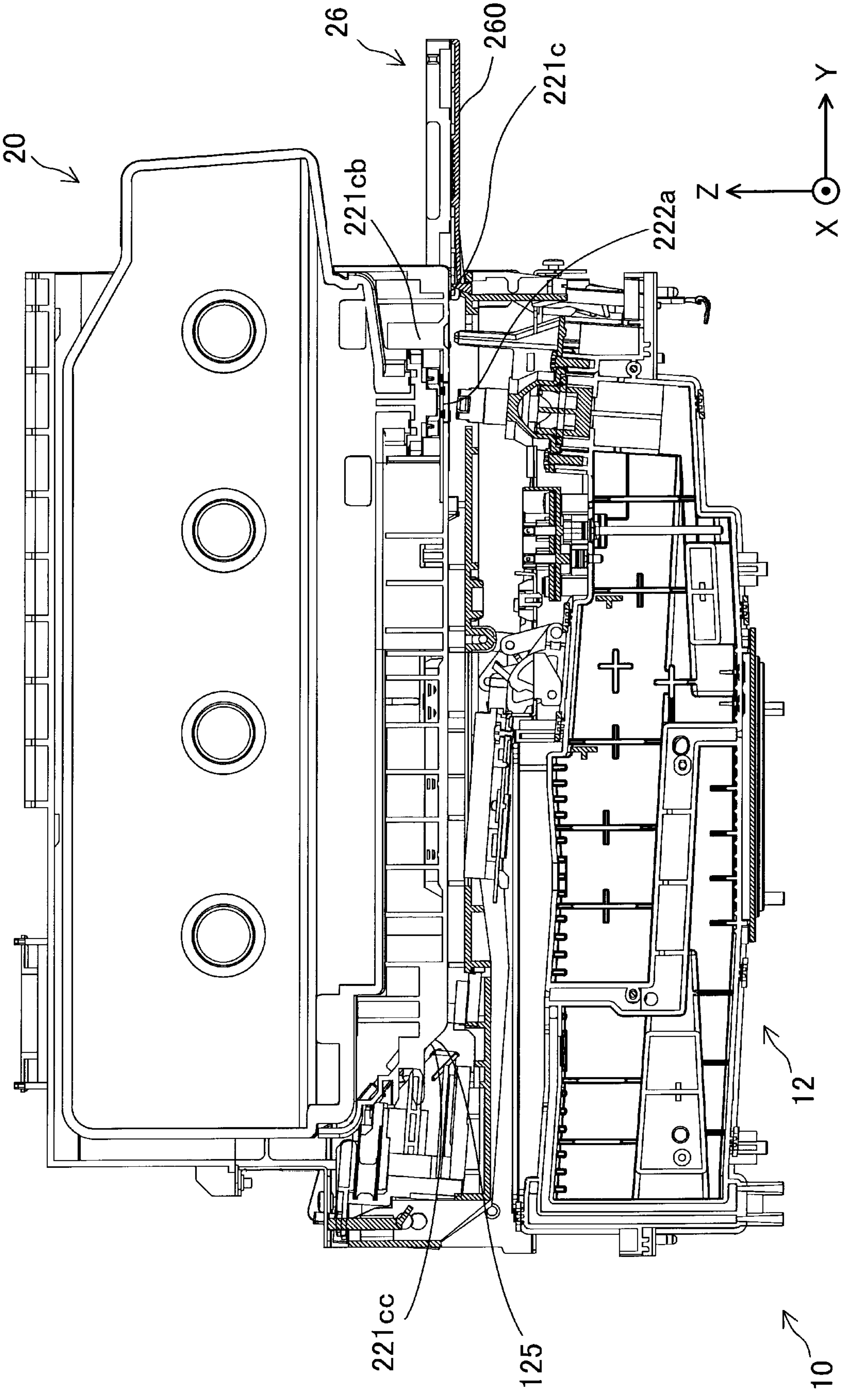
FIG. 12 is a cross-sectional view illustrating the ink cartridge and the printing apparatus in a state of being inserted into the printing apparatus and before mounting is completed.

FIG. 12 is a cross-sectional view illustrating the ink cartridge 20 and the printing apparatus 10 in a state of being inserted into the printing apparatus 10 and before mounting is completed. FIG. 12 is a cut surface of the YZ plane passing through the center of the supply port 222*a*. In FIG. 12, a part of the hatching is not illustrated. The same applies to FIG. 13, which will be described later. The shutter 26 is relatively displaced with respect to the accommodation container 21 in the direction away from the supply port 222*a* by restricting the movement in the Y direction. In the present embodiment, since the shutter 26 is restricted from moving in the Y direction at the position illustrated in FIG. 10, the accommodation container 21 is displaced to the −Y side with respect to the printing apparatus 10, and accordingly, the shutter 26 is relatively displaced with respect to the accommodation container 21 in the +Y direction side, which is a direction away from the supply port 222*a*. As a result, the supply port 222*a* and the supply port positioning section 221*cb* are exposed from the shutter 26. In this manner, when the ink cartridge 20 is mounted in the printing apparatus 10, the shutter 26 opens the supply port 222*a* as the ink cartridge 20 is displaced in the −Y direction.

Then, as illustrated in FIG. 12, the user inserts the accommodation container 21 up to the position where the contact between the cartridge-side terminal 221*cc* of the accommodation container 21 and the apparatus-side terminal portion 125 of the cartridge mounting section 12 is completed. In this state, the adapter bottom wall 221*c* is in contact with the end portion on the −Y side of the sealing wall 260 of the shutter 26.

Figure 13:
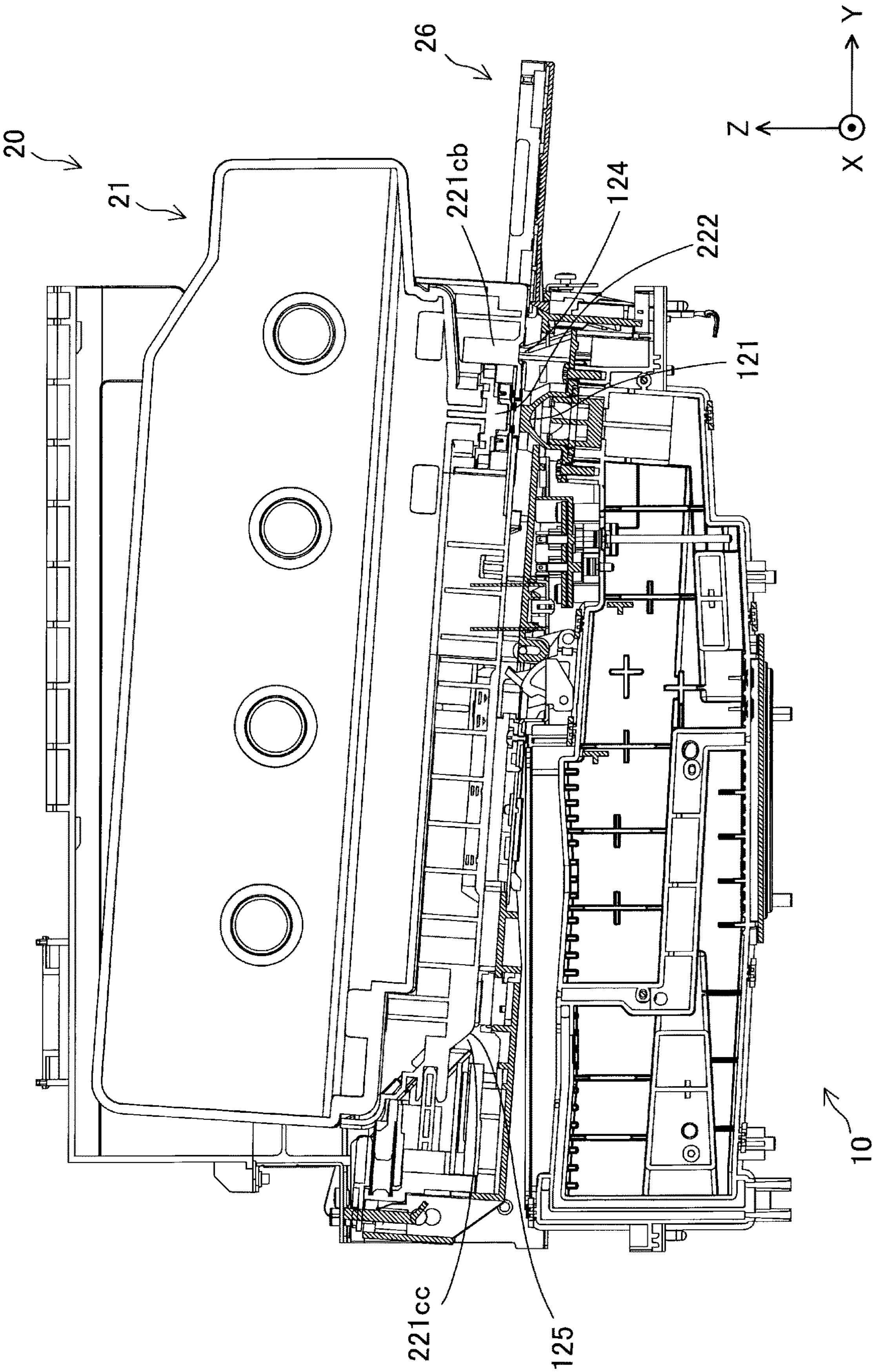
FIG. 13 is a view in which a mounting of the ink cartridge in the printing apparatus is completed.

FIG. 13 is a view in which the mounting of the ink cartridge 20 in the printing apparatus 10 is completed. In a state where the cartridge-side terminal 221*cc* adheres to the apparatus-side terminal portion 125, the user rotates the accommodation container 21 in a direction having the −z direction component, with the end portion on the −Y side of the cartridge mounting section 12 as a rotation fulcrum. As a result, as illustrated in FIG. 13, the liquid introduction section 121 and the liquid supply section 222 are coupled to each other. Further, the apparatus-side supply port positioning section 124 of the printing apparatus 10 is fitted into the supply port positioning section 221*cb*. Accordingly, the mounting of the ink cartridge 20 in the printing apparatus 10 is completed. The accommodation container 21 is held in the printing apparatus 10 by a component of the cartridge mounting section 12 (not illustrated). Further, in the cartridge mounted state, the shutter 26 is held by the printing apparatus 10.

The removal of the ink cartridge 20 will be described. From the state of FIG. 13, the end portion of the accommodation container 21 on the +Y direction side is lifted up by the user to the +Z direction side, and the accommodation container 21 is rotated on the +Z direction side with the rotation fulcrum as a fulcrum. As a result, the liquid supply section 222 comes off from the liquid introduction section 121. Further, the apparatus-side supply port positioning section 124 comes off from the supply port positioning section 221*cb*. At this time, the support member 122 fitted into the first groove portion 221*f* rotates to the +Z direction side as the accommodation container 21 rotates to the +Z direction side. Accordingly, the shutter 26 fixed by the first support hole portion 122*ba* and the second support hole portion 122*ca* also rotates in the +Z direction side, and the accommodation container 21 and the shutter 26 return to the state in FIG. 12. In this state, when the accommodation container 21 is moved from a predetermined position in the +Y direction by a user, the support guide 122Ca comes off from the first groove portion 221*f* of the accommodation container 21, and the first guide 272 is fitted into the first groove portion 221*f*, and the second guide 282 is fitted into the second groove portion 221*g*. Thereby, the movement of the shutter 26 in the Z direction is restricted.

When the accommodation container 21 is further moved in the +Y direction, the first projection portion 271 rides on the first locking section 221*h* due to elastic deformation, and moves to the −Y side with respect to the first locking section 221*h*. In addition, the second projection portion 281 rides on the second locking section 221*i* due to elastic deformation, and moves to the −Y side with respect to the second locking section 221*i*. Further, as the adapter-side positioning section 221*ca* comes into contact with the shutter-side position determination section 261, the movement of the shutter 26 to the −Y direction side is restricted. Accordingly, the shutter 26 is displaced to the +Y direction side as the accommodation container 21 is displaced to the +Y direction side. When the ink cartridge 20 is removed from the printing apparatus 10 in this manner, as the ink cartridge 20 is displaced in the +Y direction with respect to the printing apparatus 10, the shutter 26 is relatively displaced with respect to the accommodation container 21 in a direction approaching the supply port 222*a*, and closes the supply port 222*a*.

As the accommodation container 21 is displaced in the +Y direction with respect to the printing apparatus 10, the first protrusion portion 262*b* fitted into the first support hole portion 122*ba* illustrated in FIG. 10 is pulled to the +Y direction side, and comes off from the first support hole portion 122*ba*. Similarly, the second protrusion portion 263*b* fitted into the second support hole portion 122*ca* comes off from the second support hole portion 122*ca* by being pulled to the +Y direction side.

A5. Attachment/Detachment of Shutter 26 to and from Accommodation Container 21:

The removal of the shutter 26 from the accommodation container 21 will be described. First, as illustrated in FIG. 9, from the state in FIG. 4, the shutter 26 is pulled to the +D2 direction side by the user. At this time, the first projection portion 271 overcomes the first locking section 221*h* due to elastic deformation, and the second projection portion 281 overcomes the second locking section 221*i* due to elastic deformation. Although not illustrated in FIG. 9, the first guide 272 moves in the first groove portion 221*f* in the +D2 direction, and the second guide 282 moves in the second groove portion 221*g* in the +D2 direction. The first guide 272 comes off from the end portion of the first groove portion 221*f* on the +D2 side, and the second guide 282 comes off from the end portion of the second groove portion 221*g* on the +D2 side. Thereby, the shutter 26 is removed from the accommodation container 21.

The attachment of the shutter 26 to the accommodation container 21 will be described. As illustrated in FIG. 9, the first guide 272 and the second guide 282 are inserted into the accommodation container 21 by the user such that the first guide 272 is fitted into the end portion of the first groove portion 221*f* on the +D2 side, and the second guide 282 is fitted into the end portion of the second groove portion 221*g* on the +D2 direction side. In this state, when the shutter 26 is displaced to the −D2 direction side with respect to the accommodation container 21, the first projection portion 271 overcomes the first locking section 221*h*, and the second projection portion 281 overcomes the second locking section 221*i*. The shutter-side position determination section 261 comes into contact with the adapter-side positioning section 221*ca*, and the displacement of the shutter 26 to the −D2 direction side is restricted. In this manner, the shutter 26 is attached to the accommodation container 21.

In the ink cartridge 20 of the present embodiment, when the ink cartridge 20 is attached to the printing apparatus 10, the supply port 222*a* is opened, and the ink is supplied to the printing apparatus 10. On the other hand, when the ink cartridge 20 is removed from the printing apparatus 10, the supply port 222*a* is closed by the shutter 26, and accordingly, when the ink leaks from the supply port 222*a*, the shutter 26 can receive the ink. Therefore, it is possible to prevent the ink leakage of the ink cartridge 20. Further, since the shutter 26 is configured to be attachable to and detachable from the accommodation container 21, the ink adhering to the shutter 26 can be washed, and the shutter 26 can be replaced.

The ink cartridge 20 of the present embodiment has a configuration in which the first protrusion portion 262*b* and the second protrusion portion 263*b* are formed in the shutter 26, and the first protrusion portion 262*b* and the second protrusion portion 263*b* are fitted to and come off from the first support hole portion 122*ba* and the second support hole portion 122*ca*, and thus the supply port 222*a* can be opened and closed by the shutter 26. In addition, since the first groove portion 221*f* and the second groove portion 221*g* are formed at the end portion of the accommodation container 21, the first guide 272 is removed or inserted from the first groove portion 221*f*, and the second guide 282 is removed or inserted from the second groove portion 221*g*, and accordingly, the shutter 26 can be attached to and detached from the accommodation container 21. In addition, the first guide 272 moves the first groove portion 221*f* in the D2 direction, the second guide 282 moves the second groove portion 221*g* in the D2 direction, and accordingly, in a state where the shutter 26 is mounted in the accommodation container 21, the accommodation container 21 can be displaced with respect to the accommodation container 21 in the Y direction, which is the attachment/detachment direction. Therefore, the attachment/detachment of the shutter 26 to and from the accommodation container 21 and the displacement with respect to the accommodation container 21 can be realized with the same configuration.

Further, in a state where the shutter 26 is mounted on the accommodation container 21, the first projection portion 271 is positioned on the −D2 direction side, which is the mounting direction, with respect to the first locking section 221*h*, and the second projection portion 281 is positioned on the −D2 direction side with respect to the second locking section 221*i*. Accordingly, it is possible to suppress the shutter 26 from being displaced with respect to the ink cartridge 20 to the +D2 direction side, which is the removal direction. Thereby, for example, when the ink cartridge 20 is transported, the shutter 26 is displaced in the removing direction, and accordingly, the shutter 26 can be prevented from coming off from the accommodation container 21.

B. Second Embodiment

B1. Configuration of Second Embodiment

Figure 14:
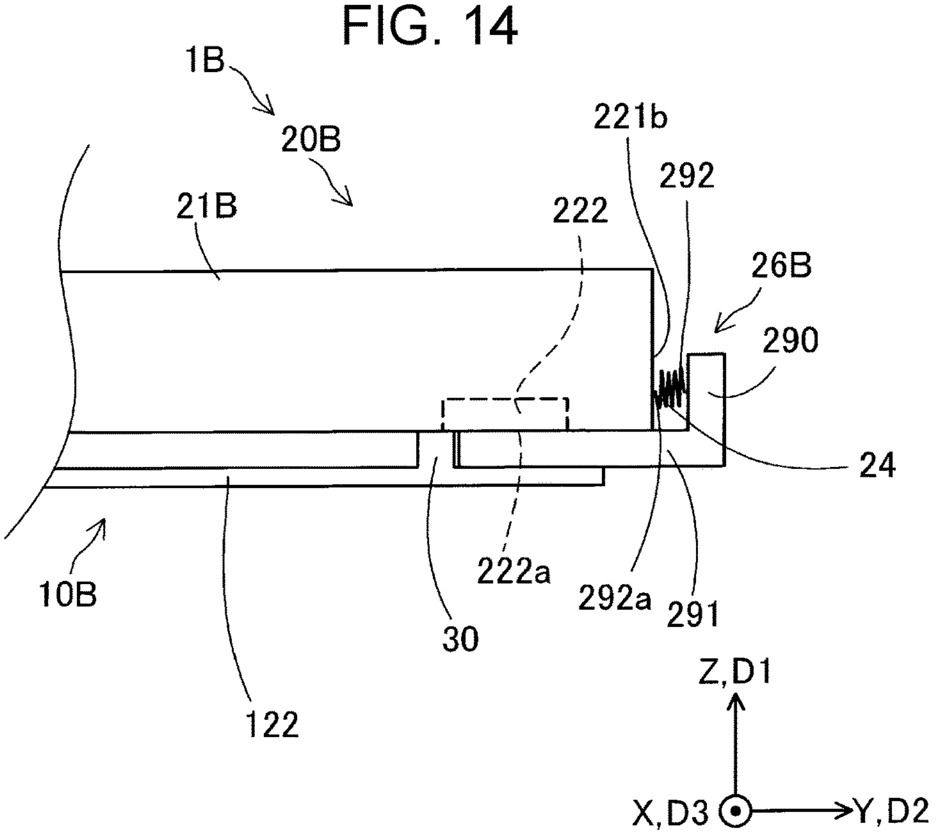
FIG. 14 is a schematic view for describing a printing system according to a second embodiment.

FIG. 14 is a schematic view for describing a printing system 1B according to a second embodiment. FIG. 14 shows a part of the printing apparatus 10B and simply shows the ink cartridge 20B. In addition, in FIG. 14, the liquid supply section 222 is illustrated by a broken line for the sake of description. The printing system 1 of the second embodiment is different from the first embodiment in that the printing apparatus 10 includes an abutting section 30 without the first support locking section 122*b* and the second support locking section 122*c*, and the configuration of a shutter 26B is different from that of the first embodiment. Since the other configurations are the same as those of the first embodiment, the same reference numerals will be given and the detailed description thereof will be omitted.

Similar to the first embodiment, a direction along the central axis of the supply port 222*a* is defined as the D1 direction, a direction intersecting the D1 direction is defined as the D2 direction, and a direction perpendicularly intersecting the D1 direction and the D2 direction is defined as the D3 direction. When the ink cartridge 20 is displaced with respect to the printing apparatus 10 in the Y direction, the D1 direction is parallel to the Z direction, the D2 direction is parallel to the Y direction which is the attachment/detachment direction, and the D3 direction is parallel to the X direction.

The support member 122 of the printing apparatus 10B according to the second embodiment includes the abutting section 30. The abutting section 30 restricts the movement of the shutter 26 in the −Y direction by abutting against the end portion of the shutter 26 on the −Y direction side when the ink cartridge 20 is attached to the printing apparatus 10. The abutting section 30 extends in the +Z direction at the end portion on the +Y side of the support member 122.

The accommodation container 21B according to the second embodiment includes a hole portion 24 (not illustrated). The hole portion 24 is a part in which an elastic member 292 can be fitted. The hole portion 24 is formed at the adapter rear wall 221*b* which is the end portion of the accommodation container 21B on the +D2 direction side.

The shutter 26B of the second embodiment includes a holding wall 290, a bottom wall 291, and an elastic member 292. The elastic member 292 is coupled to the holding wall 290. The holding wall 290 has a substantially rectangular shape extending in the Z direction and the X direction.

The bottom wall 291 closes the supply port 222*a*. The bottom wall 291 is coupled to the end portion of the holding wall 290 on the −D1 direction side at the end portion on the +D2 direction side. The bottom wall 291 has a substantially rectangular shape extending in the D2 direction and the D3 direction. The dimension of the bottom wall 291 in the D3 direction is the same as the dimension of the holding wall 290 in the D3 direction. The holding wall 290 includes the uneven portion 264 (not illustrated) on the surface on the +D1 direction side. The configuration of the uneven portion 264 is the same as that of the uneven portion 264 of the first embodiment. Although not illustrated in FIG. 14, the shutter 26 is configured such that an air gap is formed between the uneven portion 264 and the supply port 222*a* in a state where the shutter 26 closes the supply port 222*a*. Since the uneven portion 264 receives the ink, it is possible to prevent the ink from leaking from the ink cartridge 20.

The elastic member 292 is configured to draw the accommodation container 21B to the +D2 direction side, which is a direction approaching the shutter 26B in the D2 direction. Specifically, the elastic member 292 is configured to draw the accommodation container 21B to the +D2 direction side when a force to the −D2 direction side is not applied to the accommodation container 21B by the user. The elastic member 292 is coupled to the holding wall 290. The elastic member 292 includes a fitting section 292*a*. The fitting section 292*a* can be attachably and detachably fitted into the hole portion 24 of the adapter rear wall 221*b* of the accommodation container 21. The fitting section 292*a* can be removed from the hole portion 24 by the user. Further, the fitting section 292*a* can be fitted into the hole portion 24 by the user. The fitting section 292*a* is formed at the end portion of the elastic member 292 on the −D2 direction side.

Figure 15:
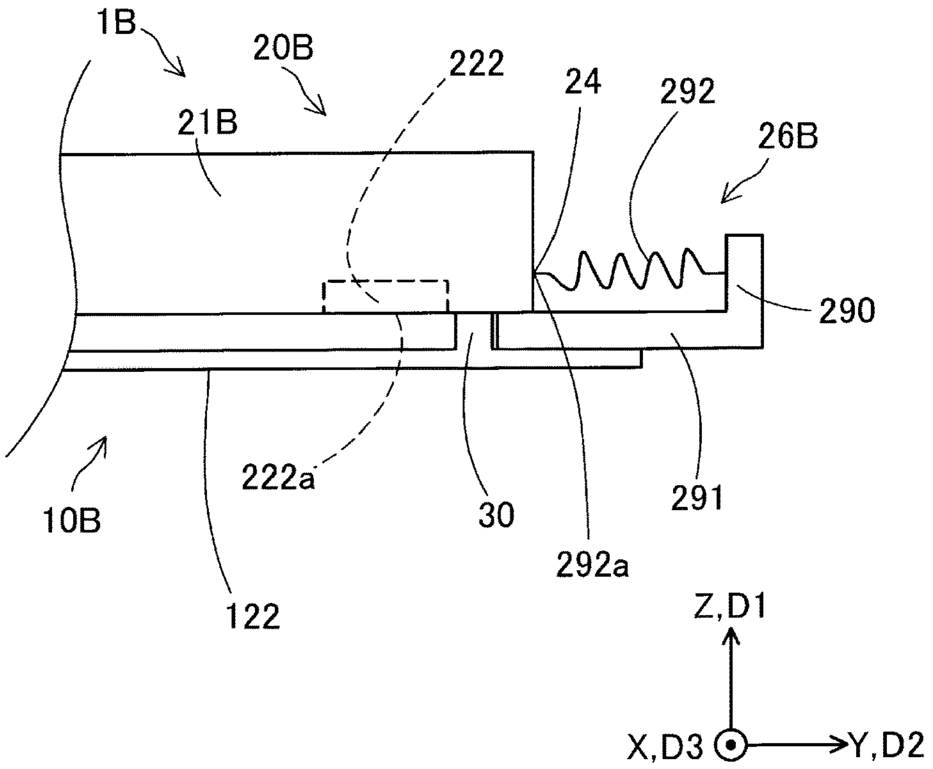
FIG. 15 is a view for describing a state where the ink cartridge is inserted into the printing apparatus.

B2. Attachment/Detachment of Ink Cartridge 20B to and from Printing Apparatus 10B:

FIG. 15 is a view for describing a state where the ink cartridge 20B is inserted into the printing apparatus 10B. The mounting of the ink cartridge 20B in the printing apparatus 10B will be described. First, the user inserts the ink cartridge 20 into the printing apparatus 10B on the −Y direction side. As illustrated in FIG. 14, the end portion of the bottom wall 291 on the −Y direction side abuts against the abutting section 30, and thus, the movement of the shutter 26B in the −Y direction side is restricted. In this state, as illustrated in FIG. 15, when the accommodation container 21B is pressed in the −Y direction side by the user, the elastic member 292 is elastically deformed and extends in the Y direction. Thereby, the shutter 26B is relatively displaced with respect to the accommodation container 21B in the +Y direction, which is a direction away from the supply port 222*a*, and the supply port 222*a* is opened. Thereafter, the ink cartridge 20B is mounted in the printing apparatus 10B as in the first embodiment.

The removal of the ink cartridge 20B from the printing apparatus 10B will be described. First, as in the first embodiment, the accommodation container 21B is pulled in the +Y direction by the user. The elastic member 292 is elastically deformed and contracts in the Y direction, and is relatively displaced in the −Y direction, which is a direction approaching the accommodation container 21B. As a result, the supply port 222*a* is closed by the shutter 26B.

In the second embodiment, when the ink cartridge 20B is attached to the printing apparatus 10B, the abutting section 30 abuts against the shutter 26B, and thus the movement of the shutter 26B in the mounting direction is restricted. Since the accommodation container 21B is moved in the direction away from the shutter 26B by the user, the supply port 222*a* is opened. At this time, the accommodation container 21B is pulled in a direction opposite to a direction in which the elastic member 292 is pulled, as the accommodation container 21B moves in a direction away from the shutter 26B. On the other hand, when the ink cartridge 20B is removed from the printing apparatus 10B, the elastic member 292 pulls the accommodation container 21B to return to the original shape. Accordingly, the shutter 26B closes the supply port 222*a*. In addition, since the elastic member 292 can be fitted into the hole portion 24 and come off from the hole portion 24, the shutter 26B can be attached to and detached from the accommodation container 21B. By fitting the elastic member 292 into the hole portion 24, it is possible to prevent the shutter 26B from coming off from the accommodation container 21B during the transport of the ink cartridge 20B. Further, by removing the shutter 26B, ink adhering to the shutter 26B can be washed and the shutter 26B can be replaced.

C. Third Embodiment

An ink cartridge 20C of a third embodiment differs from the above-described embodiment in that the shutter 26C includes the liquid absorbing member 28. Since other configurations are the same as those of the first embodiment, the same reference numerals will be given and the detailed description thereof will be omitted. The ink cartridge 20C is not illustrated.

The ink cartridge 20C of the third embodiment includes the liquid absorbing member 28 and the plurality of shutter recess portions 265. When the ink leaks from the supply port 222*a*, the liquid absorbing member 28 absorbs the leaked ink. The liquid absorbing member 28 is disposed at a part facing the supply port 222*a* in the shutter mounted state. In the third embodiment, the liquid absorbing member 28 is disposed at the same part as the part of the sealing wall 260 formed with the uneven portion 264 of the first embodiment illustrated in FIG. 8. The liquid absorbing member 28 is formed of a material having the property of absorbing the liquid, such as a porous body formed of a synthetic resin.

The shutter recess portion 265 of the third embodiment has the same configuration as the shutter recess portion 265 of the first embodiment. The shutter recess portion 265 is recessed in a direction away from the supply port 222*a* at a part where the liquid absorbing member 28 is not disposed, on a surface facing the supply port 222*a*.

The ink cartridge 20C of the third embodiment can prevent ink from leaking from the ink cartridge 20C by the liquid absorbing member 28 absorbing ink in a state where the ink cartridge 20C is not mounted in the printing apparatus 10. In addition, when the ink leaks from the liquid absorbing member 28, the shutter recess portion 265 can hold the ink.

D. Other Embodiments

D1. Other Embodiment 1

(1) In the above embodiment, as the shutter-side position determination section 261 comes into contact with the adapter-side positioning section 221*ca*, the displacement of the shutter 26 in the −D2 direction is restricted. For example, as the shutter-side position determination section and the adapter-side positioning section are configured to be fitted to each other, displacement of the shutter in the −D2 direction may be restricted.

(2) In the above embodiment, the sealing wall 260 of the shutter 26 has a substantially rectangular shape extending in the D2 direction and the D3 direction. For example, the shutter may extend in the D2 direction and the D3 direction and have a substantially circular shape when viewed from the D1 direction.

(3) In the above embodiment, the material of the shutter 26 is polypropylene. For example, the material of the shutter may be a material other than polypropylene, such as polyethylene or polyethylene terephthalate.

D2. Other Embodiment 2

(1) In the first embodiment, the shutter 26 has elasticity. For example, only the first fixing section and the second fixing section may have elasticity among parts forming the shutter. In addition, the shutter may not include the second fixing section and may include only the first fixing section.

(2) In the first embodiment, the first fixing section includes the first rod-shaped portion 262*a* and the first protrusion portion 262*b*, and the second fixing section 263 includes the second rod-shaped portion 263*a* and the second protrusion portion 263*b*. For example, the shutter may include only the first protrusion portion and the second protrusion portion, or may include only the first protrusion portion.

(3) In the first embodiment, the first protrusion portion 262*b* and the second protrusion portion 263*b* extend in the Z direction, and the first support hole portion 122*ba* and the second support hole portion 122*ca* are formed at the support bottom wall 122A. For example, the first support hole portion may be formed at the first support side wall, the second support hole portion may be formed at the second support side wall, the first support projected portion and the second support projected portion may extend in the X direction, the first protrusion portion and the second protrusion portion may extend in the X direction, the first protrusion portion may be fitted into the first support hole portion, and the second protrusion portion may be fitted into the second support hole portion.

D3. Other Embodiment 3

(1) In the first embodiment, the first groove portion 221*f* and the second groove portion 221g extend along the D2 direction when viewed in the D3 direction. Further, for example, the first groove portion and the second groove portion may extend along the D2 direction when viewed in the D1 direction. In addition, for example, the second groove portion may not be formed in the accommodation container, and only the first groove portion may be formed. For example, the accommodation container may include only one groove portion, and the shutter may include one guide fitted into the groove portion.

(2) For example, in the shutter of the third embodiment, the groove portion may be formed in the bottom wall, the guide fitted into the groove portion may be formed in the shutter, and the guide may be able to move the groove portion in the D2 direction. Further, a locking section that extends in the D1 direction may be formed at the bottom wall, and a projection portion that faces the locking section in the D2 direction and is positioned with respect to the locking section in the +D2 direction may be formed in the shutter.

D4. Other Embodiment 4

(1) In the above embodiment, the shutter 26 includes the first projection portion 271 and the second projection portion 281 protruding in the D3 direction, and the accommodation container 21 includes the first locking section 221*h* and the second locking section 221*i*. In addition, for example, the first projection portion and the second projection portion may protrude in the D1 direction, and the first locking section and the second locking section may extend in the D1 direction. Further, for example, the shutter may include one projection portion, and the accommodation container may include one locking section.

(2) For example, in an aspect in which a component for fixing the shutter and the accommodation container is attached by the user at the end portion of the shutter on the +D2 direction side, in the shutter mounted state, the shutter may not include a projection portion, and the accommodation container may not include a locking section. D5. Other Embodiment 5:

In the second embodiment, the elastic member 292 is fitted into the hole portion 24 of the accommodation container 21. In addition, for example, in an aspect in which the elastic member and the end portion of the accommodation container on the +D2 direction side are bonded to each other by an adhesive, and the adhesive is removed by a user such that the shutter can be attached to and detached from the accommodation container, the elastic member may not be configured to be fitted into the hole portion, and the accommodation container may not be provided with a hole portion.

D6. Other Embodiment 6

In the third embodiment, the shutter includes a liquid absorbing member. In addition, for example, in the aspect in which the structure that holds the liquid is formed in the shutter by the capillary force, the shutter may not include the liquid absorbing member.

D7. Other Embodiment 7

In the above embodiment, the shutter includes a plurality of shutter recess portions. Only one shutter recess portion may be formed or may not be formed.

D8. Other Embodiment 8

In the above embodiment, the shutter includes an uneven portion at a part facing the supply port. For example, an uneven portion may be formed at a part that does not face the supply port in addition to the part facing the supply port. In addition, the shutter may not include an uneven portion.

E. Other Aspects

The present disclosure is not limited to the above-described embodiments and can be realized with various aspects without departing from the spirit thereof. For example, the present disclosure can also be realized by the following aspects. For example, the technical features in the aspects corresponding to the technical features in each aspect described below are to solve some or all of the above-described problems, or in order to achieve some or all of the above-described effects, replacement or combination can be performed as appropriate. Unless the technical features are described as essential in the present specification, deletion is possible as appropriate.

(1) According to an aspect of the present disclosure, there is provided an ink cartridge attachable to and detachable from the printing apparatus by being displaced along an attachment/detachment direction, which is a predetermined direction at a predetermined position with respect to the printing apparatus. The ink cartridge includes: an accommodation container configured to accommodate an ink and include a supply port for supplying the ink to the printing apparatus; and a shutter configured to open and close the supply port and close the supply port in a state where the ink cartridge is not mounted in the printing apparatus, and the shutter is configured to open the supply port by being relatively displaced with respect to the accommodation container in a direction away from the supply port, as the ink cartridge is displaced with respect to the printing apparatus in a mounting direction of the attachment/detachment direction when the ink cartridge is mounted in the printing apparatus, be held in the printing apparatus when the ink cartridge is mounted in the printing apparatus, close the supply port by being relatively displaced with respect to the accommodation container in a direction approaching the supply port, as the ink cartridge is displaced with respect to the printing apparatus in a removing direction, which is a direction opposite to the mounting direction, when the ink cartridge is removed from the printing apparatus, and be attached to and detached from the accommodation container.

According to the ink cartridge of this aspect, when the ink cartridge is attached to the printing apparatus, the supply port is opened, and the ink is supplied to the printing apparatus. On the other hand, when the ink cartridge is removed from the printing apparatus, the supply port is closed by the shutter, and accordingly, when the ink leaks from the supply port, the shutter can receive the ink. Therefore, it is possible to prevent the ink leakage of the ink cartridge. Further, since the shutter is configured to be attachable to and detachable from the accommodation container, the ink adhering to the shutter can be washed, and the shutter can be replaced.

(2) In the ink cartridge of the above aspect, the shutter may include a protrusion portion which is an elastic protrusion portion that extends in a direction perpendicular to the mounting direction, and is configured to be fitted into a hole portion formed in the printing apparatus when the ink cartridge is displaced with respect to the printing apparatus in the mounting direction, the protrusion portion may be configured to come into contact with a projected portion which is fitted into the hole portion and extends in a direction perpendicular to the mounting direction at a position on the mounting direction side with respect to the hole portion in the printing apparatus, as the ink cartridge is displaced with respect to the printing apparatus in the mounting direction when the ink cartridge is mounted in the printing apparatus, and come off from the hole portion as the ink cartridge is displaced in the removing direction when the ink cartridge is removed from the printing apparatus, and the shutter may be restricted from moving in the attachment/detachment direction and is relatively displaced with respect to the accommodation container in a direction away from the supply port, as the protrusion portion is fitted into the hole portion and comes into contact with the projected portion when the ink cartridge is mounted on the printing apparatus, and may have a configuration in which the protrusion portion comes off from the hole portion, as the ink cartridge is relatively displaced with respect to the accommodation container in a direction approaching to the supply port when the ink cartridge is removed from the printing apparatus.

According to the ink cartridge of this aspect, with a configuration in which the protrusion portion is formed in the shutter, and the protrusion portion is fitted into and comes off from the hole portion, the supply port can be opened and closed by the shutter.

(3) In the ink cartridge of the above aspect, when a direction along a central axis of the supply port is defined as a first direction, a direction that intersects the first direction, and is parallel to the attachment/detachment direction when the ink cartridge is displaced with respect to the printing apparatus in the attachment/detachment direction is defined as a second direction, and a direction perpendicularly intersecting the first direction and the second direction is defined as a third direction, the accommodation container may include a groove portion that extends along the second direction from an end portion of the accommodation container in the second direction when viewed in the third direction, the shutter may include a guide configured to be fitted into the groove portion by being inserted into the end portion of the accommodation container, and the guide may have a shape extending in the second direction and a dimension in the second direction which is smaller than a dimension of the groove portion, and may be configured to move the groove portion in the second direction in a state of being fitted into the groove portion.

According to the ink cartridge of this aspect, since the groove portion is formed at the end portion of the accommodation container, the shutter can be attached to and detached from the accommodation container by removing or inserting the guide from and to the groove portion. In addition, as the guide moves the groove portion in the second direction, and accordingly, in a state where the shutter is mounted in the accommodation container, the shutter can be displaced with respect to the accommodation container in the attachment/detachment direction. Therefore, the attachment/detachment of the shutter to and from the accommodation container and the displacement with respect to the accommodation container can be realized with the same configuration.

(4) In the ink cartridge of the above aspect, when a direction along a central axis of the supply port is defined as a first direction, a direction that intersects the first direction, and is parallel to the attachment/detachment direction when the ink cartridge is displaced with respect to the printing apparatus in the attachment/detachment direction is defined as a second direction, and a direction perpendicularly intersecting the first direction and the second direction is defined as a third direction, the accommodation container may include, in the second direction, a locking section extending in the third direction on a side opposite to an end portion of the accommodation container in the second direction with respect to the supply port, the shutter may include an elastic projection portion, and the projection portion, in a state where the shutter is mounted in the accommodation container, may be configured to protrude in the third direction and is positioned with respect to the locking section on a direction side in which the shutter is inserted into the accommodation container in the second direction, be elastically deformed to overcome the locking section and be displaced with respect to the locking section to the removing direction side, as the ink cartridge is displaced in the mounting direction with respect to the printing apparatus, and be elastically deformed to overcome the locking section and be displaced with respect to the locking section to the mounting direction side, as the ink cartridge is displaced with respect to the printing apparatus in the removing direction.

According to the ink cartridge of this aspect, in a state where the shutter is mounted in the accommodation container, the projection portion is positioned on the side in which the shutter is inserted into the accommodation container in the second direction, with respect to the locking section. Accordingly, it is possible to suppress the shutter from being displaced in a direction of coming off from the accommodation container. Thereby, for example, when the ink cartridge is transported, the shutter is displaced in the direction of coming off from the accommodation container, and accordingly, it is possible to prevent a case of coming off from the accommodation container.

(5) In the ink cartridge of the above aspect, when a direction along a central axis of the supply port is defined as a first direction, a direction that intersects the first direction, and is parallel to the attachment/detachment direction when the ink cartridge is displaced with respect to the printing apparatus in the attachment/detachment direction is defined as a second direction, and a direction perpendicularly intersecting the first direction and the second direction is defined as a third direction, the accommodation container may include a hole portion in an end portion in the second direction, and the shutter may include an elastic member configured to be attached to and detached from the hole portion and configured to draw the accommodation container in a direction approaching the shutter in the second direction, and may be relatively displaced with respect to the accommodation container in a direction away from the supply port by abutting against an abutting section formed in the printing apparatus and extending in the first direction and being restricted from moving in the mounting direction when the ink cartridge is mounted on the printing apparatus.

According to the ink cartridge of this aspect, when the ink cartridge is attached to the printing apparatus, the abutting section and the shutter abut against each other, and thus the movement of the shutter in the mounting direction is restricted. Since the accommodation container is moved in the direction away from the shutter by the user, the supply port is opened. At this time, the accommodation container is pulled in a direction opposite to a direction in which the elastic member is pulled, as the accommodation container moves in a direction away from the shutter. On the other hand, when the ink cartridge is removed from the printing apparatus, the elastic member pulls the accommodation container to return to the original shape. As a result, the shutter closes the supply port. In addition, since the elastic member can be fitted into the hole portion and come off from the hole portion, the shutter can be attached to and detached from the accommodation container. By fitting the elastic member into the hole portion, it is possible to prevent the shutter from coming off from the accommodation container during the transport of the ink cartridge. Further, by removing the shutter, ink adhering to the shutter can be washed and the shutter can be replaced.

(6) In the ink cartridge of the above aspect, the shutter may include a liquid absorbing member which is disposed at a part facing the supply port in a state where the shutter is mounted in the ink accommodation container, and absorbs the ink.

According to the ink cartridge of this aspect, it is possible to prevent ink from leaking from the ink cartridge by the liquid absorbing member absorbing ink in a state where the ink cartridge is not mounted in the printing apparatus.

(7) In the ink cartridge of the above aspect, when a direction along a central axis of the supply port is defined as a first direction, a direction that intersects the first direction, and is parallel to the attachment/detachment direction when the ink cartridge is displaced with respect to the printing apparatus in the attachment/detachment direction is defined as a second direction, and a direction perpendicularly intersecting the first direction and the second direction is defined as a third direction, the shutter may have a shape extending in the second direction and the third direction, and may include one or more shutter recess portions which are recessed in a direction away from the supply port in the first direction at a part at which the liquid absorbing member is not disposed, on a surface facing the supply port.

According to the ink cartridge of this aspect, when the ink leaks from the liquid absorbing member, the shutter recess portion can hold the ink.

(8) In the ink cartridge of the above aspect, when a direction along a central axis of the supply port is defined as a first direction, a direction that intersects the first direction, and is parallel to the attachment/detachment direction when the ink cartridge is displaced with respect to the printing apparatus in the attachment/detachment direction is defined as a second direction, and a direction perpendicularly intersecting the first direction and the second direction is defined as a third direction, the shutter, in a state of being mounted in the accommodation container, may have a shape extending in the second direction and the third direction, may include an uneven portion at a part facing the supply port, and may include the supply port within a range where the uneven portion is formed when viewed in the first direction.

According to the ink cartridge of this aspect, the uneven portion receives the ink, it is possible to prevent the ink from leaking from the ink cartridge.

What is claimed is:

1. An ink cartridge configured to be attached to and detached from a printing apparatus by being displaced along an attachment/detachment direction, which is a predetermined direction at a predetermined position with respect to the printing apparatus, the ink cartridge comprising:

- an accommodation container configured to accommodate an ink and include a supply port for supplying the ink to the printing apparatus; and
- a shutter configured to open and close the supply port and close the supply port in a state where the ink cartridge is not mounted in the printing apparatus, wherein
- the shutter is configured to:
  - open the supply port by being relatively displaced with respect to the accommodation container in a direction away from the supply port, as the ink cartridge is displaced with respect to the printing apparatus in a mounting direction of the attachment/detachment direction when the ink cartridge is mounted in the printing apparatus, be held in the printing apparatus when the ink cartridge is mounted in the printing apparatus, close the supply port by being relatively displaced with respect to the accommodation container in a direction approaching the supply port, as the ink cartridge is displaced with respect to the printing apparatus in a removing direction, which is a direction opposite to the mounting direction, when the ink cartridge is removed from the printing apparatus, and be attached to and completely detachable from the ink cartridge, wherein the shutter includes a protrusion portion which is an elastic protrusion portion that extends in a direction perpendicular to the attachment/detachment direction, and is configured to be fitted into a hole portion formed in the printing apparatus when the ink cartridge is displaced with respect to the printing apparatus in the mounting direction, the protrusion portion is configured to come into contact with a projected portion which is fitted into the hole portion and extends in a direction perpendicular to the attachment/detachment direction at a position on the mounting direction side with respect to the hole portion in the printing apparatus, as the ink cartridge is displaced with respect to the printing apparatus in the mounting direction when the ink cartridge is mounted in the printing apparatus, and come off from the hole portion as the ink cartridge is displaced in the removing direction when the ink cartridge is removed from the printing apparatus, and the shutter is restricted from moving in the attachment/detachment direction and is relatively displaced with respect to the accommodation container in a direction away from the supply port, as the protrusion portion is fitted into the hole portion and comes into contact with the projected portion when the ink cartridge is mounted on the printing apparatus, and has a configuration in which the protrusion portion comes off from the hole portion, as the ink cartridge is relatively displaced with respect to the accommodation container in a direction approaching to the supply port when the ink cartridge is removed from the printing apparatus.

2. The ink cartridge according to claim 1, wherein when a direction along a central axis of the supply port is defined as a first direction, a direction that intersects the first direction, and is parallel to the attachment/detachment direction when the ink cartridge is displaced with respect to the printing apparatus in the attachment/detachment direction is defined as a second direction, and a direction perpendicularly intersecting the first direction and the second direction is defined as a third direction, the accommodation container includes a groove portion that extends along the second direction from an end portion of the accommodation container in the second direction when viewed in the third direction, the shutter includes a guide configured to be fitted into the groove portion by being inserted into the end portion of the accommodation container, and the guide has a shape extending in the second direction and a dimension in the second direction which is smaller than a dimension of the groove portion, and is configured to move the groove portion in the second direction in a state of being fitted into the groove portion.

3. The ink cartridge according to claim 1, wherein when a direction along a central axis of the supply port is defined as a first direction, a direction that intersects the first direction, and is parallel to the attachment/detachment direction when the ink cartridge is displaced with respect to the printing apparatus in the attachment/detachment direction is defined as a second direction, and a direction perpendicularly intersecting the first direction and the second direction is defined as a third direction, the accommodation container includes, in the second direction, a locking section extending in the third direction on a side opposite to an end portion of the accommodation container in the second direction with respect to the supply port, the shutter includes an elastic projection portion, and the projection portion, in a state where the shutter is mounted in the accommodation container, is configured to protrude in the third direction and is positioned with respect to the locking section on a direction side in which the shutter is inserted into the accommodation container in the second direction, be elastically deformed to overcome the locking section and be displaced with respect to the locking section to the removing direction side, as the ink cartridge is displaced in the mounting direction with respect to the printing apparatus, and be elastically deformed to overcome the locking section and be displaced with respect to the locking section to the mounting direction side, as the ink cartridge is displaced with respect to the printing apparatus in the removing direction.

4. The ink cartridge according to claim 1, wherein when a direction along a central axis of the supply port is defined as a first direction, a direction that intersects the first direction, and is parallel to the attachment/detachment direction when the ink cartridge is displaced with respect to the printing apparatus in the attachment/detachment direction is defined as a second direction, and a direction perpendicularly intersecting the first direction and the second direction is defined as a third direction, the accommodation container includes a hole portion in an end portion in the second direction, and the shutter includes an elastic member configured to be attached to and detached from the hole portion and configured to draw the accommodation container in a direction approaching the shutter in the second direction, and is relatively displaced with respect to the accommodation container in a direction away from the supply port by abutting against an abutting section formed in the printing apparatus and extending in the first direction and being restricted from moving in the mounting direction when the ink cartridge is mounted on the printing apparatus.

5. The ink cartridge according to claim 1, wherein the shutter includes a liquid absorbing member which is disposed at a part facing the supply port in a state where the shutter is mounted in the accommodation container, and absorbs the ink.

6. The ink cartridge according to claim 5, wherein when a direction along a central axis of the supply port is defined as a first direction, a direction that intersects the first direction, and is parallel to the attachment/detachment direction when the ink cartridge is displaced with respect to the printing apparatus in the attachment/detachment direction is defined as a second direction, and a direction perpendicularly intersecting the first direction and the second direction is defined as a third direction, the shutter has a shape extending in the second direction and the third direction, and includes one or more shutter recess portions which are recessed in a direction away from the supply port in the first direction at a part at which the liquid absorbing member is not disposed, on a surface facing the supply port.

7. The ink cartridge according to claim 1, wherein when a direction along a central axis of the supply port is defined as a first direction, a direction that intersects the first direction, and is parallel to the attachment/detachment direction when the ink cartridge is displaced with respect to the printing apparatus in the attachment/detachment direction is defined as a second direction, and a direction perpendicularly intersecting the first direction and the second direction is defined as a third direction, the shutter, in a state of being mounted in the accommodation container, has a shape extending in the second direction and the third direction, includes an uneven portion at a part facing the supply port, and includes the supply port within a range where the uneven portion is formed when viewed in the first direction.

* * * * *